United States Patent [19]
Watanabe et al.

[11] Patent Number: 5,815,283
[45] Date of Patent: Sep. 29, 1998

[54] IMAGE FORMING APPARATUS

[75] Inventors: Koichi Watanabe, Kawasaki; Hironobu Machida, Tokyo, both of Japan

[73] Assignee: Kabushiki Kaisha Toshiba, Kawasaki, Japan

[21] Appl. No.: 968,855

[22] Filed: Nov. 5, 1997

Related U.S. Application Data

[63] Continuation of Ser. No. 673,825, Jun. 27, 1996.

[30] Foreign Application Priority Data

Jun. 30, 1995 [JP] Japan .................................. 7-165504

[51] Int. Cl.⁶ ................................................. H03M 7/30
[52] U.S. Cl. .......................... 358/296; 358/539; 395/888
[58] Field of Search ..................................... 358/400, 401, 358/468, 444, 366, 539; 395/429, 261.1, 518, 888; 382/166, 222, 232, 234, 237, 246

[56] References Cited

U.S. PATENT DOCUMENTS

| | | | |
|---|---|---|---|
| 5,163,123 | 11/1992 | Kadono | 395/116 |
| 5,229,866 | 7/1993 | Kashiwagi et al. | 358/444 |
| 5,355,232 | 10/1994 | Kataoka | 358/451 |
| 5,369,505 | 11/1994 | Watanabe et al. | 358/444 |
| 5,519,499 | 5/1996 | Saito | 358/296 |
| 5,608,539 | 3/1997 | Sakamoto | 358/426 |

FOREIGN PATENT DOCUMENTS 0465093 1/1992 European Pat. Off. .

*Primary Examiner*—Peter S. Wong
*Assistant Examiner*—Gregory J. Toatley, Jr.
*Attorney, Agent, or Firm*—Foley & Lardner

[57] ABSTRACT

An image forming apparatus comprises a writing circuit that writes the image data read by a scanner into an image memory, a coding circuit that reads and codes the image data stored in the image memory and stores the coded data in a code memory, a decoding circuit that decodes the coded data stored in the code memory and writes the decoded data into the image memory, and a printer that forms an image using the decoded image data in the image memory. The writing of the scanner image data into the image memory and the coding of the image data in the image memory or the decoding of the image data in the image memory and the printing of the decoded data in the image memory are advanced simultaneously, improving the processing speed.

21 Claims, 23 Drawing Sheets

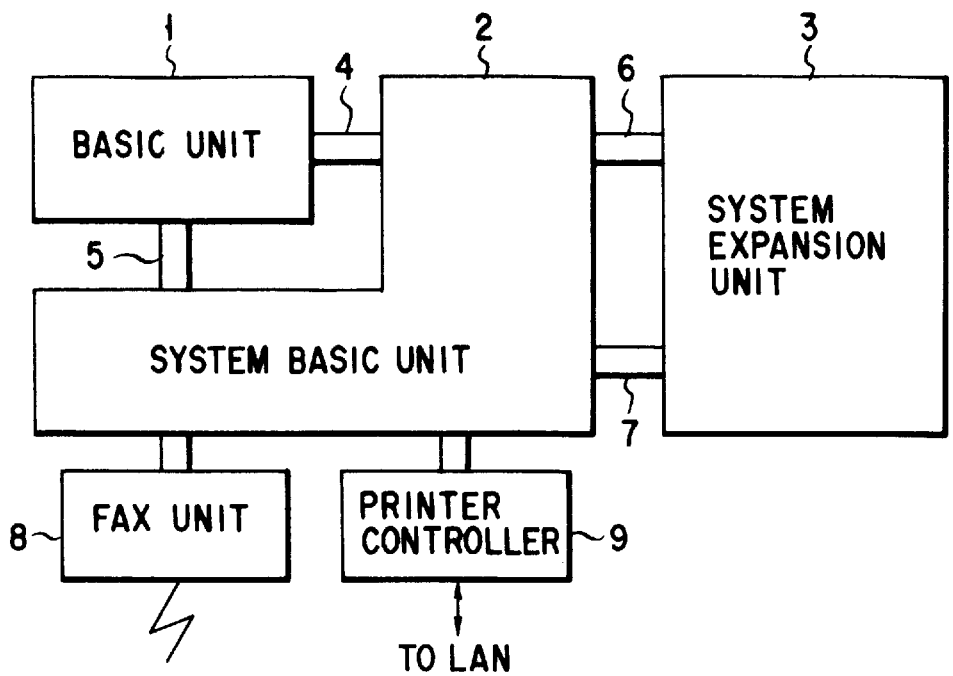
F I G. 1
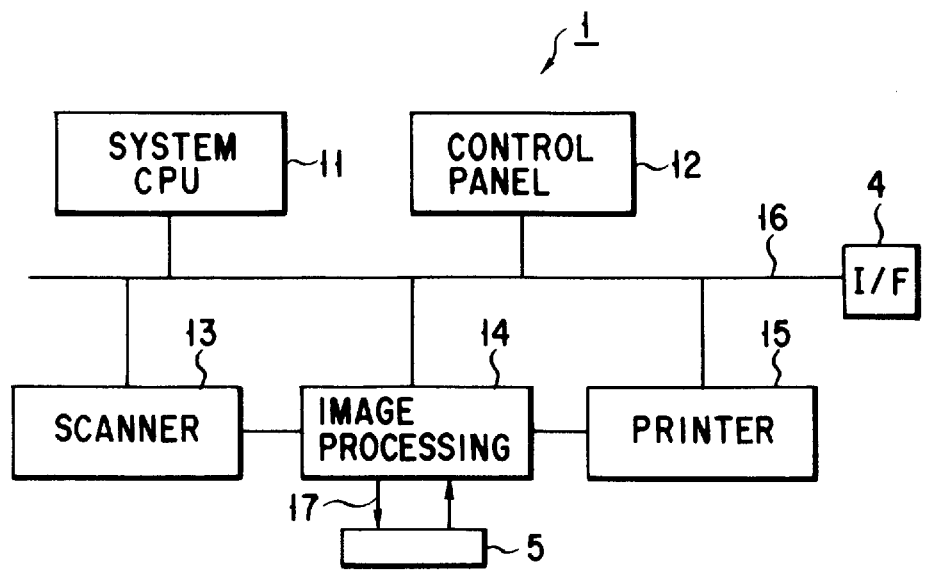
F I G. 2

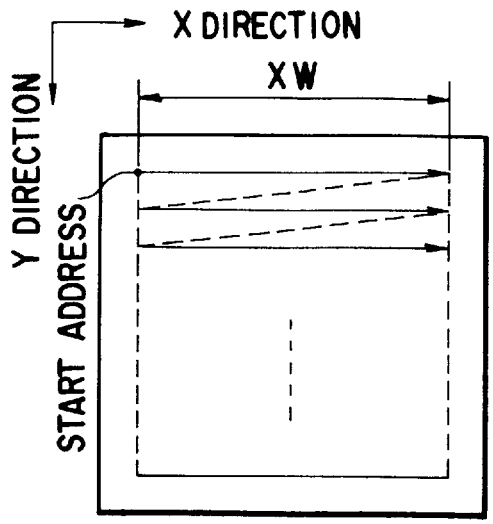 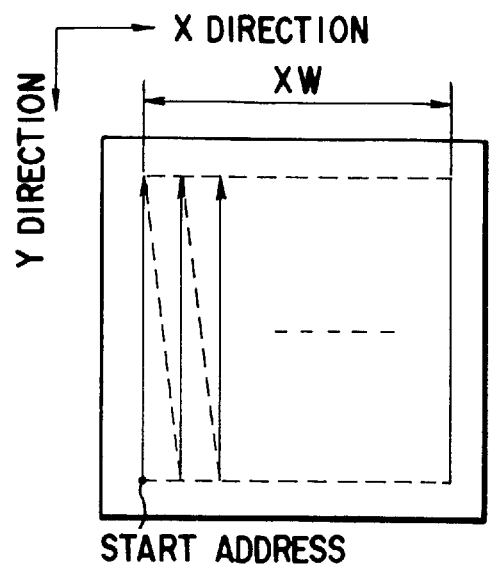
F I G. 11A     F I G. 11B
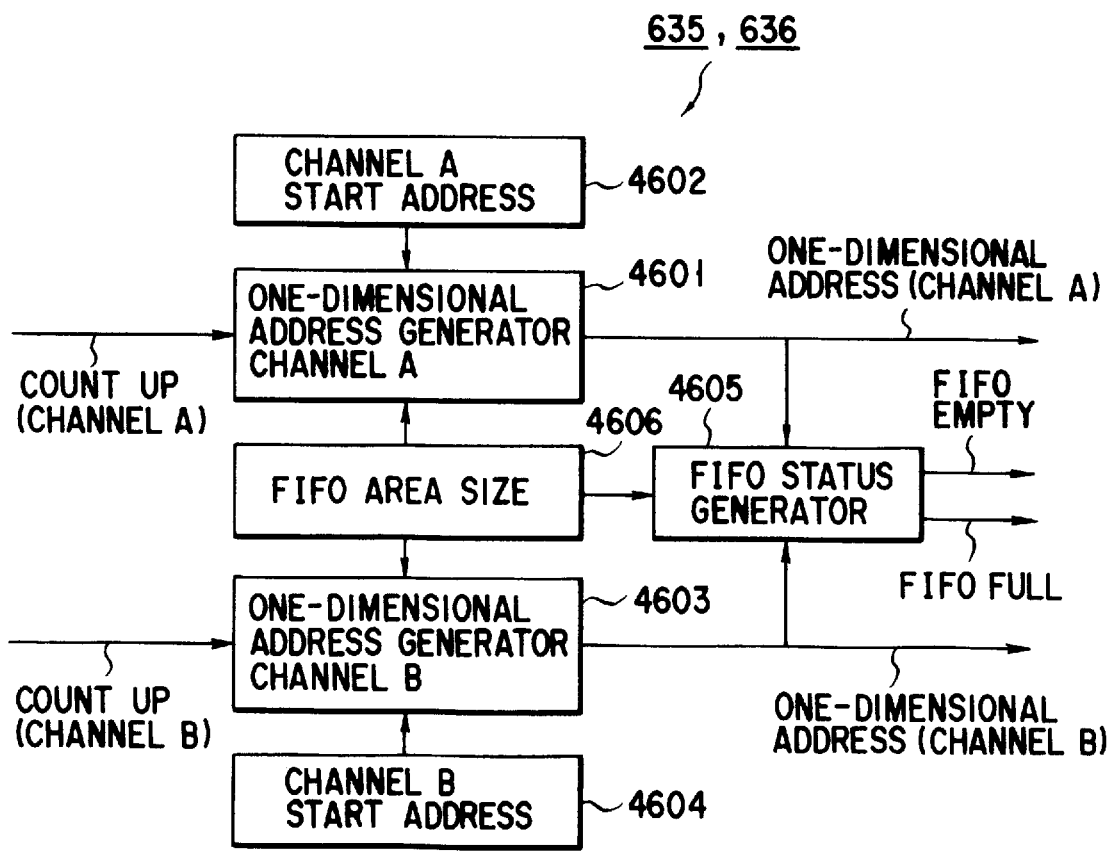
F I G. 12

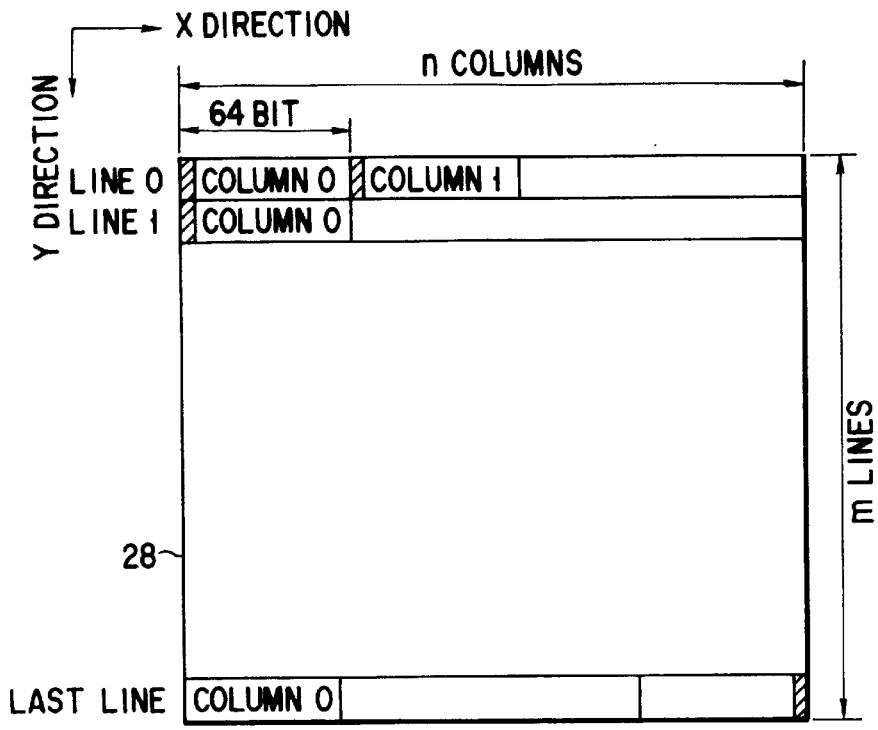
F I G. 13
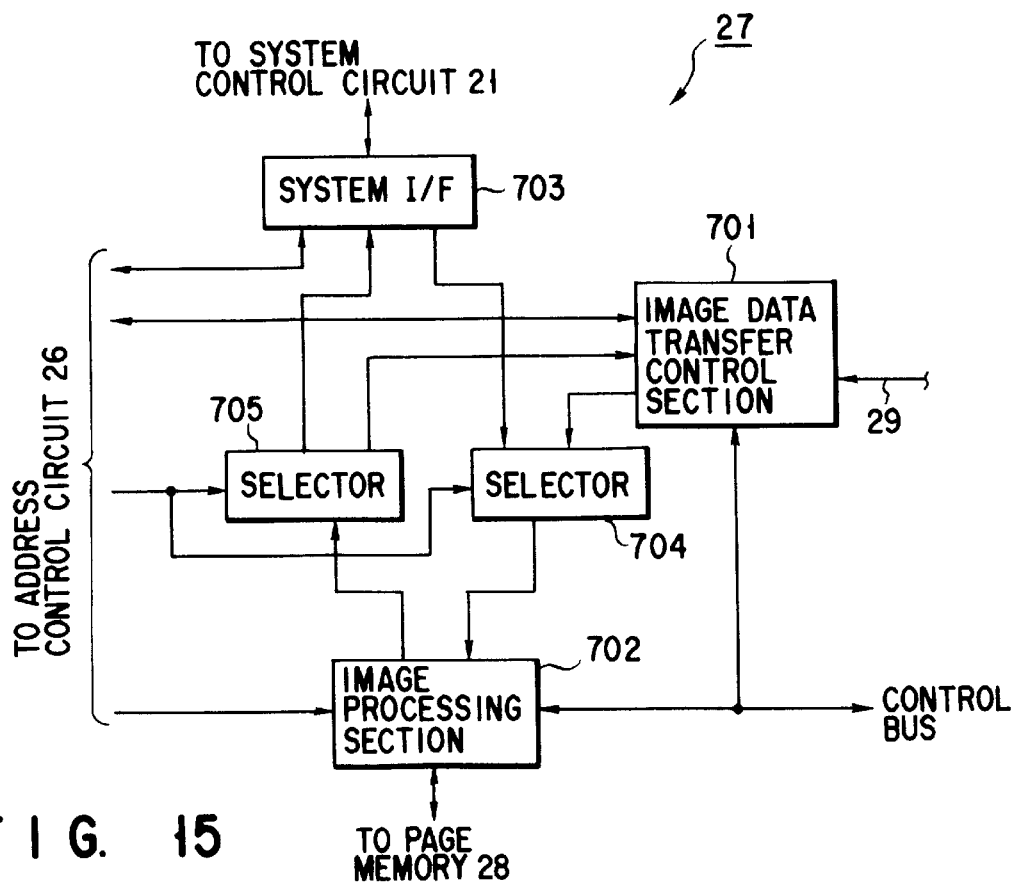
F I G. 15

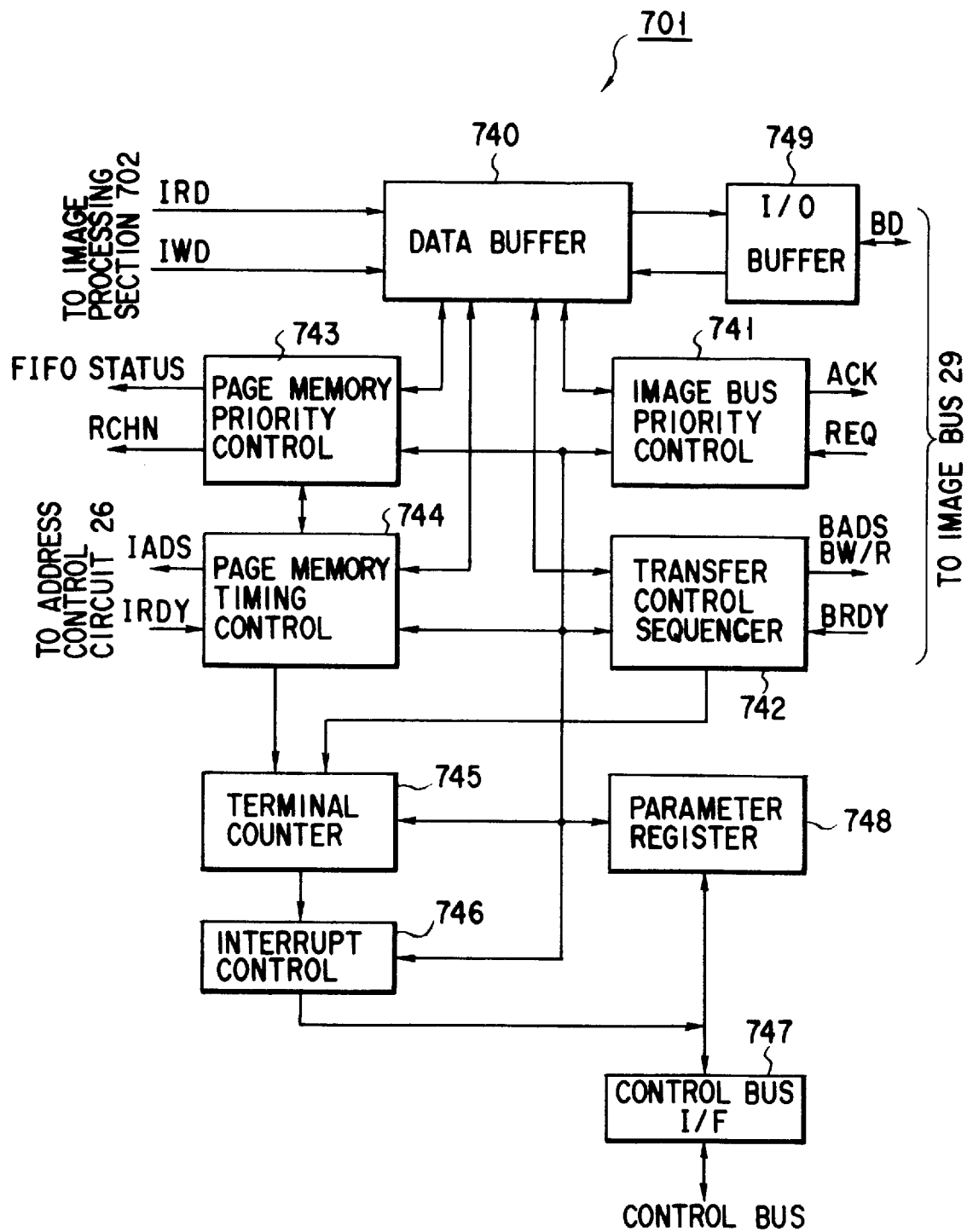
F I G. 16

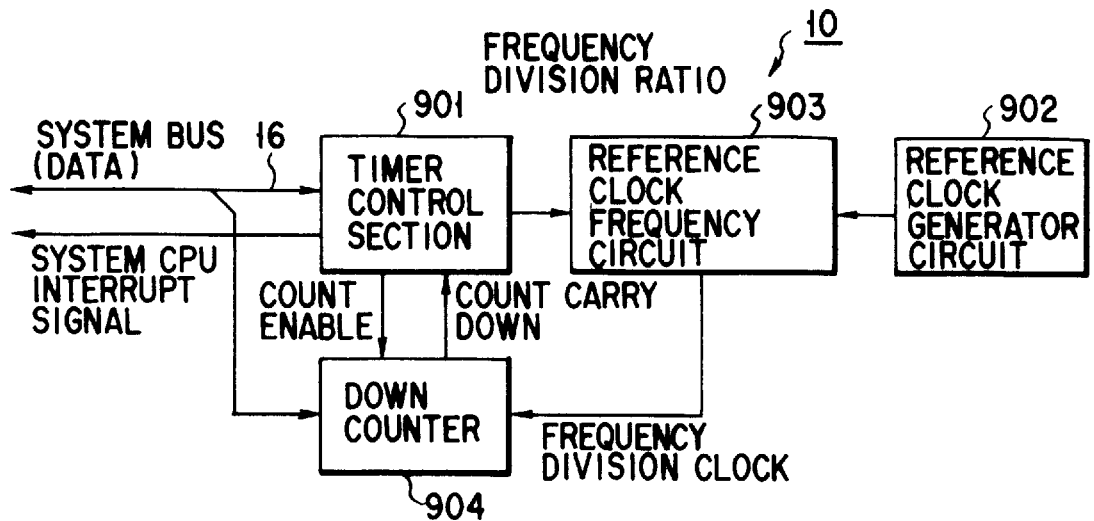
F I G. 17
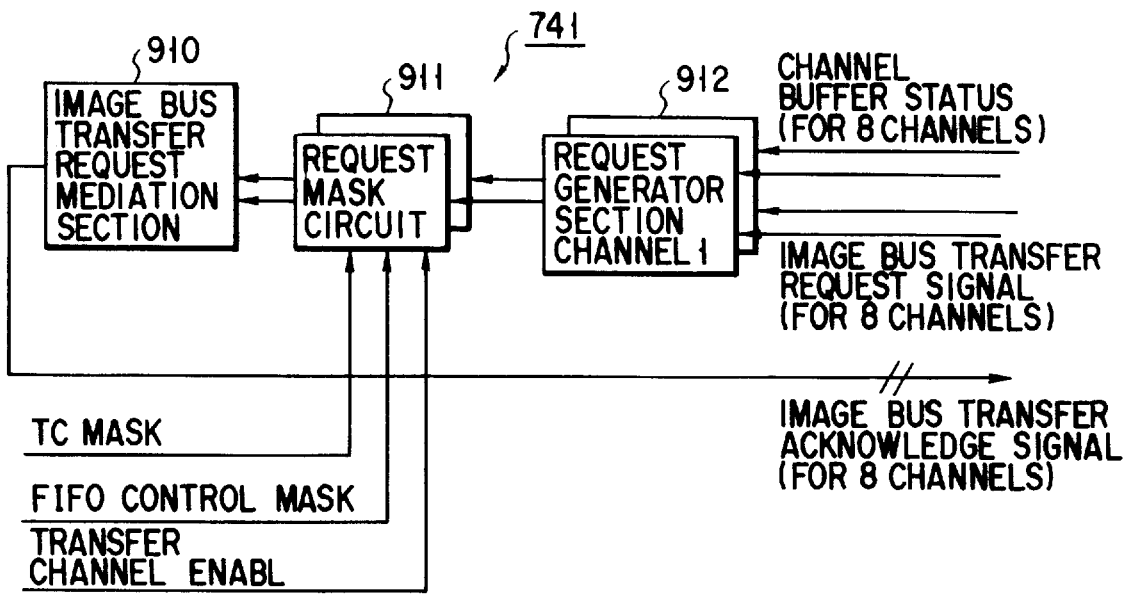
F I G. 18

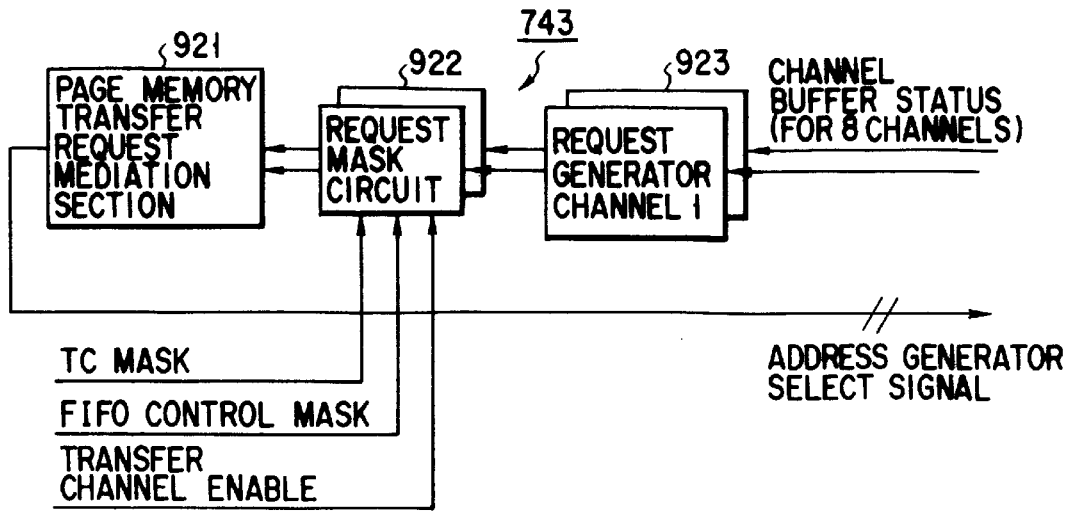
F I G. 19
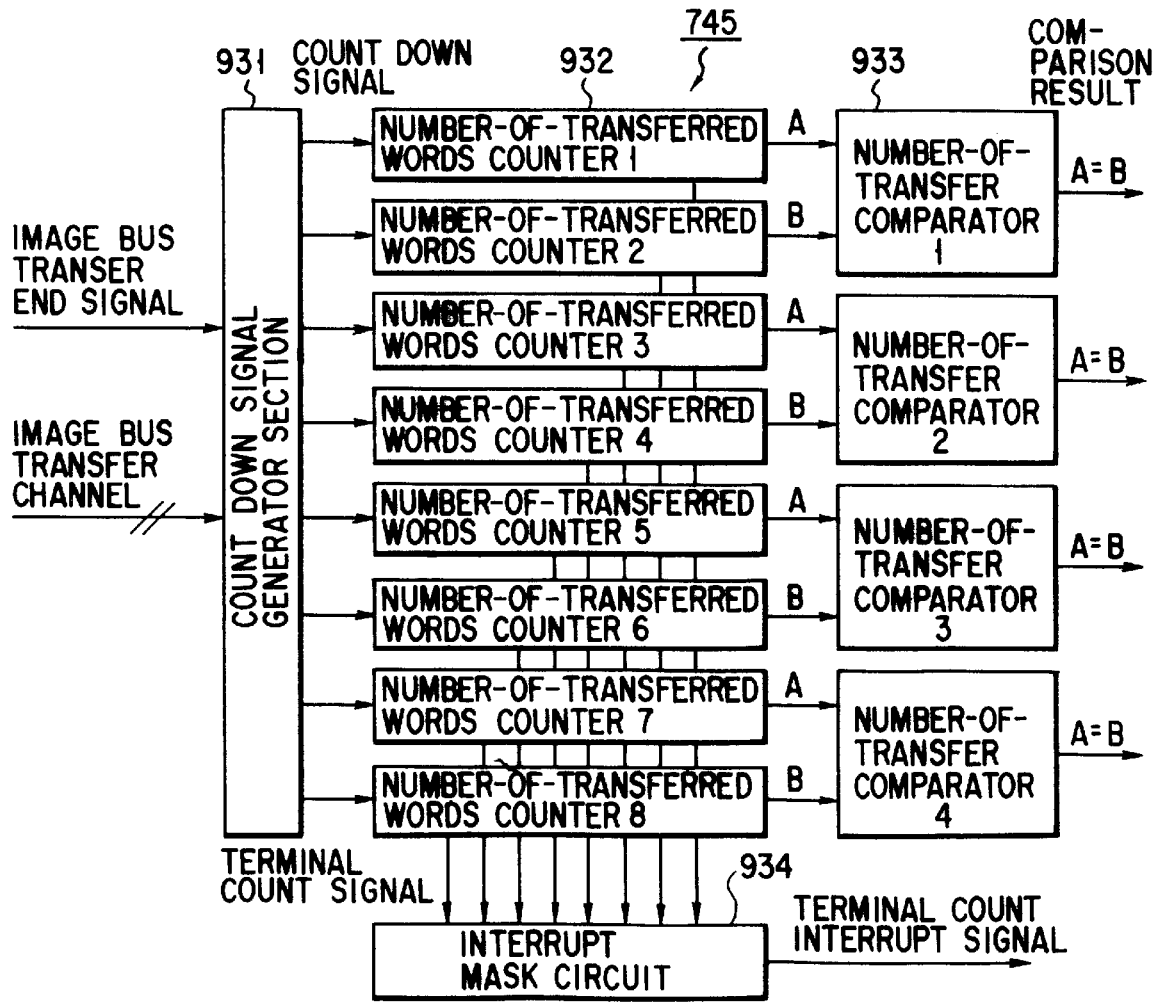
F I G. 20

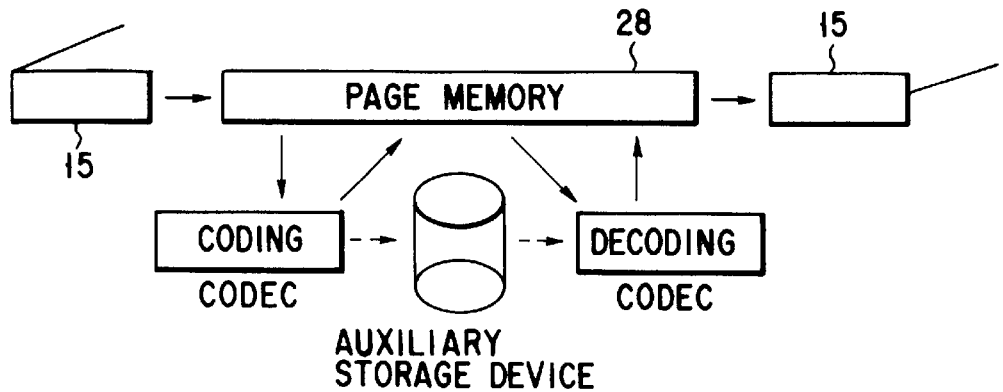
F I G. 21
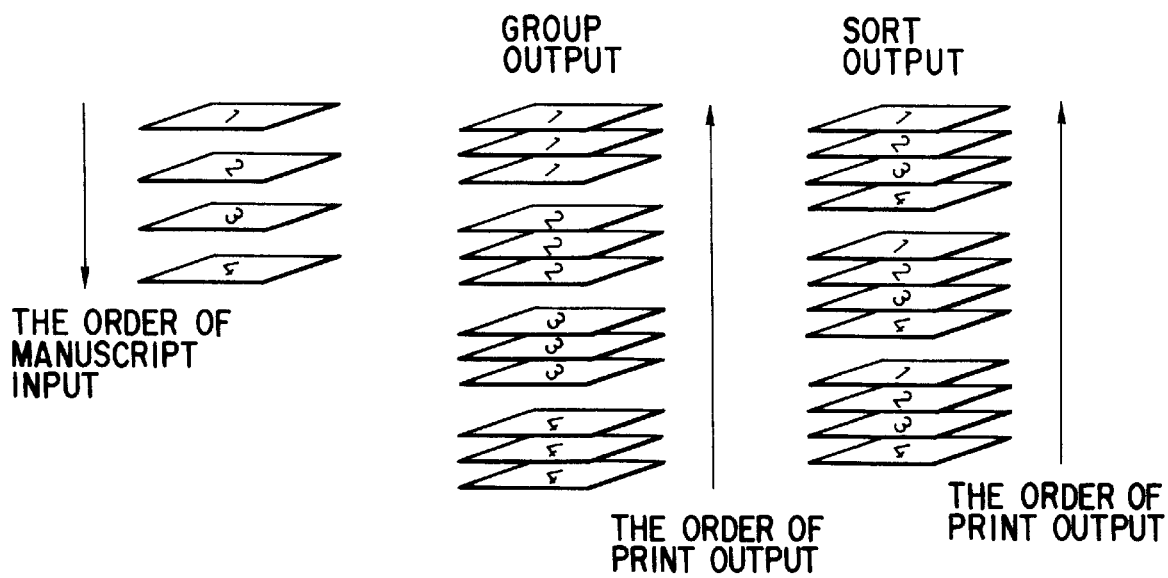
F I G. 22

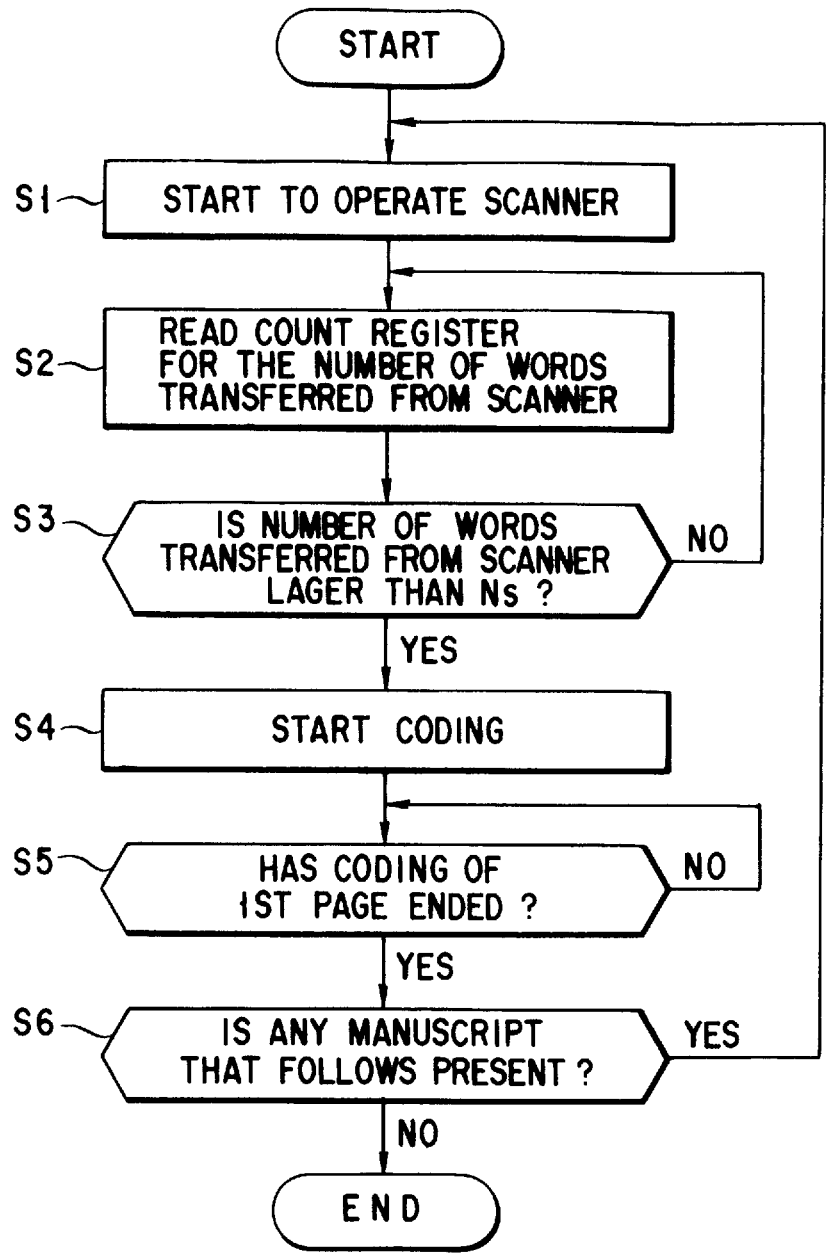
F I G. 26

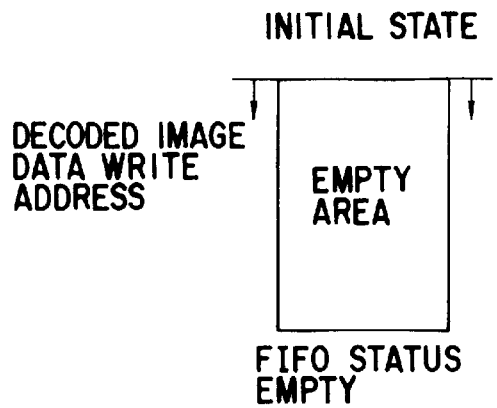
F I G. 34A
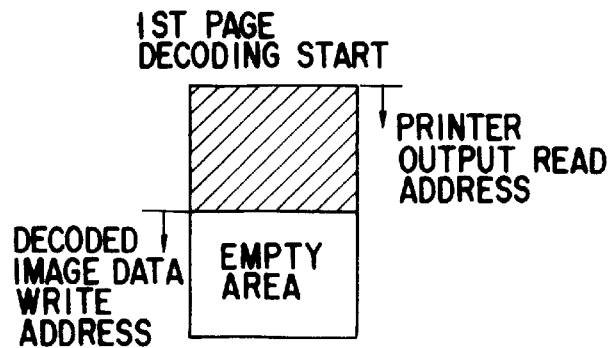
F I G. 34B
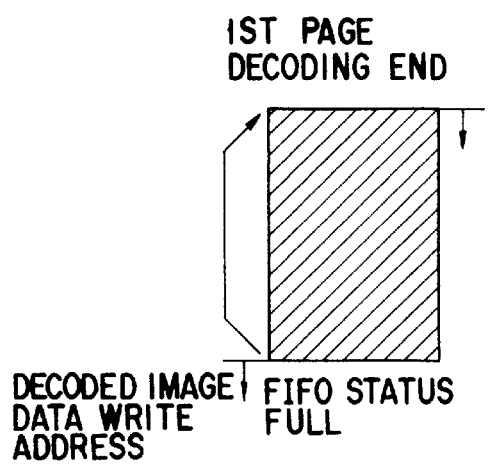
F I G. 34C
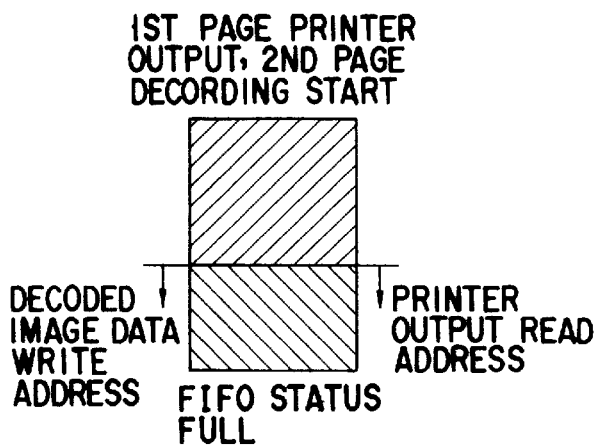
F I G. 34D
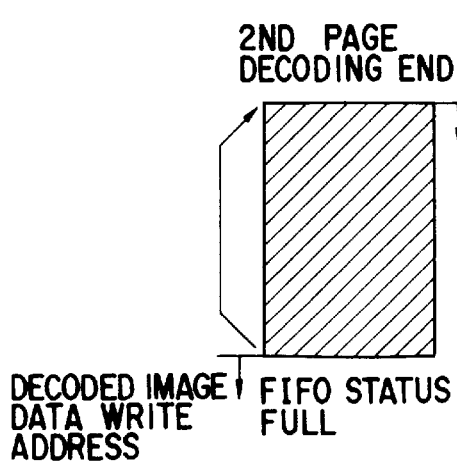
F I G. 34E
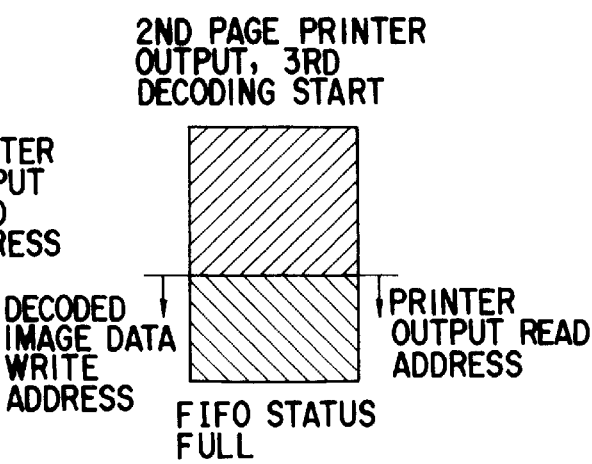
F I G. 34F

IMAGE FORMING APPARATUS

This application is a continuation of application Ser. No. 08/673,825, filed Jun. 27, 1996, now abandoned.

BACKGROUND OF THE INVENTION

1. Field of the Invention

This invention relates to an image forming apparatus, such as a digital copying machine.

2. Description of the Related Art

Recently, image information has come to be handled easily in the form of digital data. One of apparatuses using such technology is a digital PPC. Unlike a conventional analog PPC, it does not direct the reflected light from the manuscript optically to form an image on a photosensitive material. After the reflected light from the manuscript has been read by a CCD sensor in the form of an electric signal, it is converted into a digital signal. The digitized manuscript undergoes various processes and then is printed out on paper with a laser printer.

Converting the manuscript image into a digital signal enables various signal processes, including the correction of the input characteristic of the CCD sensor or the output characteristic of the laser printer, image enlargement and reduction, partial erasure, and frame outside erasure, Furthermore, the coding process of the image converted into a digital signal makes it possible to compress the amount of data and store it efficiently. The stored images can be decoded into the original images in arbitrary order in which the images are to be printed out, and any number of them can be printed out on the laser printer.

Since such rearrangement has been made mechanically on the copied print output (the image-copied sheets of paper) by the use of a sorter or a stacker, it is impossible to avoid a trend for the apparatus to get increasingly large and an increase in noise. In addition, printing on sheets of paper requires the copying operation repeatedly.

The time required to encode an image differs with the nature of the image and is not constant. If a scanner (CDD sensor) reads an image at a constant speed, the process cannot keep up with the reading speed and will lose part of the read-out data unless the coding process speed is sufficiently faster than the reading speed. To avoid this problem, a page of image memory is provided and a page of image data is temporarily entered from the scanner into the image memory. Thereafter, the coding process is performed on the image on the image memory. By doing so, the difference between the reading speed of the scanner and the speed of the coding process can be absorbed.

During the coding process, however, because the scanner cannot enter the image input into the page memory, it has to wait to enter the next image input until the coding process has ended. To eliminate the waiting, two pages of image memory are provided, which enables the scanner to enter the image input into the other empty image memory even if one image memory is in the coding process. Thus, use of two pages of image memory enables the coding process and the image input from the scanner to be performed at the same time. By doing this alternately, it is possible to carry out the coding process consecutively without causing the scanner to wait to enter the input.

Furthermore, when the coded image is decoded and the decoded data is outputted to a laser printer, the process can be performed consecutively in a similar manner. Two pages of image memory are provided. At the same time that the decoded image is written into one image memory, the already decoded image in the other image memory is read out and outputted to the laser printer. By doing this alternately, it is possible to perform the process consecutively without causing the laser printer to wait to output images.

The above-described consecutive process requires two pages of image memory. To copy a manuscript with a high picture quality, it is necessary to raise the resolution at which the manuscript is read or images are printed on the laser printer.

Naturally, as the resolution gets higher, the capacity of image memory required to achieve the resolution grows enormous. For example, when a page of A4-size manuscripts is read at a resolution of 400 dpi as monochrome data with one bit per pixel, the capacity of image memory needed is about 2 Mbytes; and when the same page is read at a resolution of 600 dpi, the image memory capacity needed is about 4.4 Mbytes. Furthermore, when the same page is read as gray scale data with 8 bits per pixel, the image memory capacity needed is as enormous as eight times the above memory capacity.

As described above, to record image data requires a tremendous capacity of memory. If two pages of memory are necessary, it will be impossible to avoid problems including an increase in costs, an increase in the number of component parts, an increase in the power consumption, and an increase in the size of apparatus.

SUMMARY OF THE INVENTION

Accordingly, it is the object of the present invention to provide an image forming apparatus capable of shortening the time required to perform a series of image forming processes, including writing image data into image memory, coding the image data, decoding the coded data, and reading the decoded image data to form images, without increasing the capacity of the image memory.

In order to achieve the above object, according to one aspect of the present invention, there is provided an image forming apparatus comprising: reading means for reading image data from a manuscript; an image memory for storing the image data read by the reading means; writing means for writing the image data read by the reading means into the image memory; coding means for reading and coding the image data stored in the image memory and storing the coded data in a code memory; decoding means for decoding the coded data stored in the code memory and writing the decoded data into the image memory; image forming means for forming an image corresponding to the decoded image data stored by the decoding means in the image memory; and control means for not only enabling the writing operation of the writing means and the coding operation of the coding means to progress simultaneously, but also performing control so that the coding operation may not pass the writing operation.

As described above, the writing of image data from the reading means into the image memory and the coding operation of reading the image data and coding the read-out data are advanced simultaneously. This shortens the processing time needed for a series of operations including the writing of image data into the image memory and the coding of the image data, without increasing the capacity of the image memory.

According to another aspect of the present invention, there is provided an image forming apparatus comprising: reading means for reading image data from a manuscript; an image memory for storing the image data read by the reading means; writing means for writing the image data read by the reading means into the image memory; coding means for reading and coding the image data stored in the image memory and storing the coded data in a code memory; decoding means for decoding the coded data stored in the code memory and writing the decoded data into the image memory; image forming means for forming an image corresponding to the decoded image data stored by the decoding means in the image memory; and control means for not only enabling the decoding operation of the decoding means and the image forming operation of the image forming means to progress simultaneously, but also performing the decoding means so that the image forming operation may not pass the decoding operation.

As described above, the decoding from the code memory to the image memory and the operation of reading the image data and forming an image are advanced simultaneously. This shortens the processing time needed for a series of operations including the decoding of the coded data and the operation of reading the decoded image data and forming an image, without increasing the capacity of the image memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a general block diagram of an embodiment of the present invention;

FIG. 2 is a block diagram of the basis unit of the embodiment;

FIGS. 11A and 11B show examples of the direction in which addresses are generated at the address generator section of FIG. 9;

FIG. 12 shows the configuration of the FIFO address generator of FIG. 10 in detail;

FIG. 13 shows the concept of two-dimensional access to the page memory of FIG. 3;

FIG. 15 is a block diagram of the data control circuit of FIG. 3;

FIG. 16 is a block diagram of the image data transfer control section of FIG. 15;

FIG. 17 is a block diagram of the timer;

FIG. 18 shows the configuration of the image bus priority control section of FIG. 16 in detail;

FIG. 19 shows the configuration of the page memory priority control section of FIG. 16 in detail;

FIG. 20 shows the configuration of the terminal counter of FIG. 16 in detail;

FIG. 21 schematically shows electronic sorting;

FIG. 22 shows an example of electronic sorting;

FIG. 26 is a flowchart for coding control;

FIGS. 34A to 34F show FIFO control in decoding.

DETAILED DESCRIPTION OF THE PREFERRED EMBODIMENTS

Figure 3:
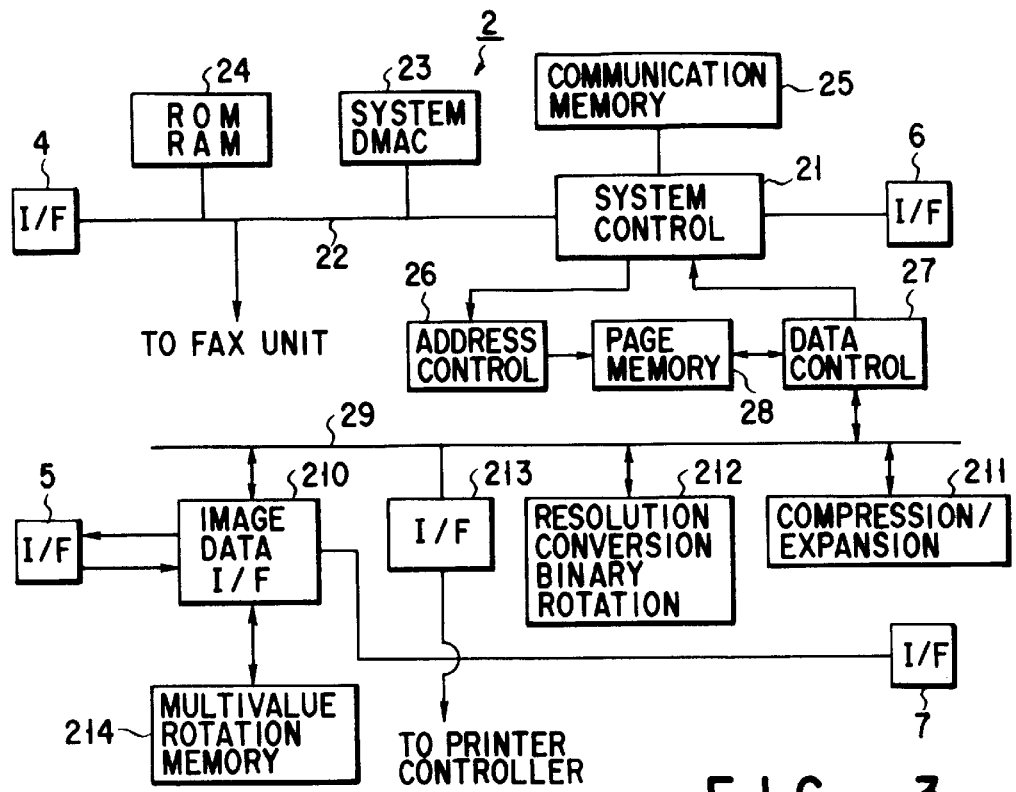
FIG. 3 is a block diagram of a system basic unit of the embodiment.

Hereinafter, an embodiment of the present invention will be explained by reference to the accompanying drawings.

FIG. 1 is a block diagram of the entire configuration of an image forming apparatus. The image forming apparatus comprises the following three systems: a basic unit 1 that executes a basic copying function; a system basic unit 2 that has a page memory that temporarily stores image data when the apparatus is connected to another system or when the image data is edited, processed, and copied; and a system expansion unit 3 that has not only an optical disk for optically semipermanently storing the image data entered from the basic unit 1, but also control means for converting image data and control data into those suited for the control system and image format of another system when the image data and control data are exchanged with another system.

The basic unit 1 and the system basic unit 2 are connected to each other by means of a basic section system interface 4 that enables exchange of control data between these two units and a basic section image interface 5 that enables exchange of image data between these two units.

The system basic unit 2 and the system expansion unit 3 are connected to each other by means of an expansion section system interface 6 that enables exchange of control data between these two units and an expansion section image interface 7 that enables exchange of image data between these two units.

That is, the basic unit 1 is not connected directly to the system expansion unit 3. Whenever control data and image data are exchanged between these two units, they pass through the system basic unit 2.

The image forming apparatus takes three forms, depending on whether it is connected to the system basic unit 2 and/or the system expansion unit 3.

Specifically, a first form is a configuration consisting of the basic unit 1 only. With this configuration, the basic function is a copying function and enables a copying process involving simple editing processes, including an enlarging/reducing process and a masking/trimming process.

A second form is such that the system basic unit 2 is connected to the basic unit 1. In addition to the copying function of the basic unit 1, the second form enables editing processes including an image rotating process and the process of combining images. The system basic unit 2 is designed to connect to a FAX (facsimile) unit 8 constituting communication channel control means, such as a facsimile, and a printer controller 9 that enables the printer for the basic unit 1 to be used as a remote printer for a control apparatus, such as an external personal computer, as well as to the system expansion unit 3. It is possible to transmit images from the FAX unit 8 to another system or apparatus via a communication channel or conversely to cause the FAX unit to receive the image data from another system or apparatus via a communication channel. The received image data is sent to the basic unit 1 and printed out on a printer explained later.

A third form is the form shown in FIG. 1, where the basic unit 1, system basic unit 2, and system expansion unit 3 are connected to each other.

In addition the functions of the first and second forms, the third form has a data storage/management function that optically semipermanently stores the image data and manages the stored image data, a LAN image data transmitting/receiving function that causes local area network (LAN) channel control means, which will be explained later, to transmit images to another system or apparatus via a LAN channel or conversely to receive the image data from another system or apparatus via a LAN channel, and a printer function that converts the print control code transmitted from a personal computer via a general-purpose interface into image data and prints out the image data on the printer of the basic unit 1 via the page memory of the system basic unit 2.

The basic unit 1, as shown in FIG. 2, comprises a system CPU 11 constituting the body of the control section, a control panel 12 provided with an operator section and a display section, an image scanner 13 serving as input means for reading images from a manuscript, an image processing circuit 14, and a printer 15 serving as output means. The system CPU 11 is connected via a basic section system bus 16 to a control panel 12, a scanner 13, an image processing circuit 14, and a printer 15 serving as output means for providing image forming output, and controls these. The basic section system bus 16 is connected to the basic section system interface 4.

The scanner 13 has a CCD line sensor (not shown) composed of light-receiving elements arranged in a line and reads the image of a manuscript put on a manuscript table (not shown) line by line according to the instruction from the system CPU 11, converts the shades of the image into 8-bit digital data, and then outputs the digital data together with a synchronizing signal as time-sequential digital data to the image processing circuit 14 via a scanner interface.

The printer 15 is made up of an image forming section (not shown) which is a combination of a laser optical system (not shown) and an electrophotograhic system capable of forming images on transfer paper. According to the instruction from the system CPU 11, the printer takes in the 4-bit digital image data from the image processing circuit 14 via a printer interface in synchronization with the synchronizing signal, forms an electrostatic latent image on a photosensitive drum (not shown) by a laser beam whose pulse width is proportional to the size of the image data, makes the electrostatic latent image visible by visualizing means (not shown), transfers the visualized image onto transfer paper by transfer means (not shown), fixes the image on the transfer paper by fixing means, and then outputs the transfer paper.

The control panel 12 is composed of an operator section for setting the operation mode of the apparatus and parameters and a display section that displays the state of the system or the image data stored in the page memory in the system basic unit 2. The system CPU 11 also controls each section of the system basic unit 2 explained later.

Figure 5:
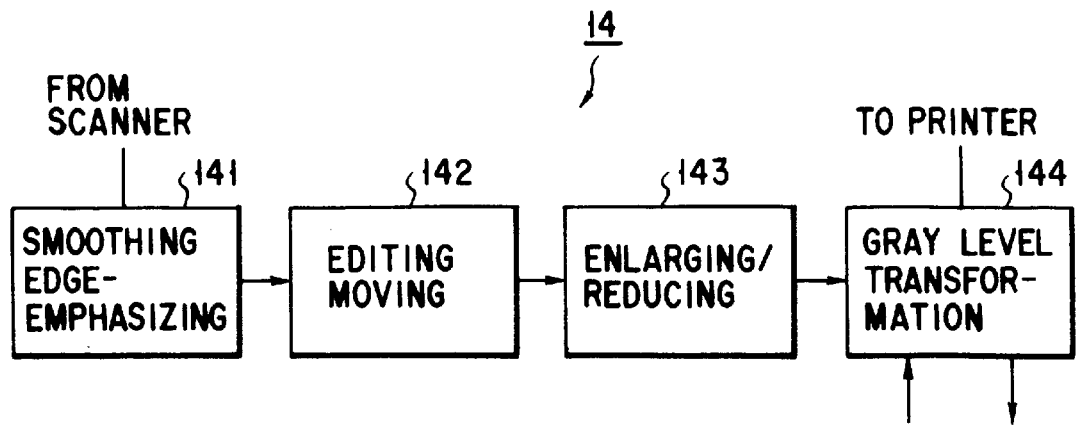
FIG. 5 is a block diagram of the image processing circuit of FIG. 2.

The image processing circuit 14, as shown in FIG. 5, comprises a smoothing edge-emphasizing circuit 141, an editing/moving circuit 142, an enlarging/reducing circuit 143, and a gray level transformation circuit 144.

The smoothing edge-emphasizing circuit 141 removes noise introduced in reading images at a smoothing circuit and sharpens the edges dulled due to smoothing at an edge emphasizing circuit.

The editing/moving circuit 142 performs simple editing processes line by line, including a moving process along a line and a masking/trimming process.

The enlarging/reducing circuit 143 performing the process of repeating pixels according to the specified magnification or an enlarging/reducing process by a combination of a curtailing process and an interpolating process.

The gray level transformation circuit 144 transforms the image data with 8 bits per pixel read by the scanner 13 into a specified number of gray levels by area gray level techniques. The gray-level-transformed image data is image data with 4 bits per pixel, the number of bits used on a printer. The image data is sent to the printer 15 or to the system basic unit 2 via the scanner data bus 17 and the basic section image interface 5. The nonlinearity of the input/output characteristic of the printer 15 is corrected by the area gray-level techniques at the same time that the gray-level process is performed.

The system basic unit 2, as shown in FIG. 3, comprises a page memory 28 that stores image data temporarily, a system control circuit 21 that controls the accessing of the basic unit 1 and system expansion unit 3 to the page memory 28, a page memory address control circuit 26 that generates addresses for the page memory 28, an image bus 29 that performs data transfer between the individual devices in the system basic unit 2, and a page memory data control circuit 27 that controls data transfer in performing data transfer between the page memory 28 and another device via the image bus 29.

The system basic unit 2 further comprises an image data I/F 210 that interfaces image data when the system basic unit exchanges image data with the basic unit 1 via the basic section image interface 5, a resolution conversion binary rotation circuit 212 that converts the image data into that with a resolution suitable for another apparatus when the image data is transmitted to the apparatus with a different resolution, converts the image data received from an apparatus with a different resolution into that with a resolution suitable for the printer 15 of the basic unit 1, or rotates the binary image data 90 degrees, and a compression/expansion circuit 211 that compresses the input image data for facsimile transmission and optical disk storage where the image data is compressed and transmitted or stored, and that expands the compressed image data for the printer 15 to visualize the data.

The system basic unit 2 further comprises a FONT memory in which character fonts are stored, a work memory that temporarily stores control information used in the system CPU 11, a system memory (ROM/RAM) 24 composed of a program memory in which processing programs used to perform processes using the system basic unit 2 are stored, a system DMA controller 23 that enables high-speed data transfer between devices in the basic section system bus 16, and a printer controller interface 213 that interfaces not only control information when the printer controller 9 exchanges the control signal with the system CPU 11, but also image data when the printer controller 9 exchanges the image data with the image bus 29.

The system basic unit 2 further comprises a system control circuit 21, a communication memory 25 in which control information is stored when control information is exchanged between the system CPU 11 and the CPU of the system expansion unit 3, an image data I/F 210, and a multivalue rotation memory 214 used to rotate the image data 90 degrees or 180 degrees and output the resulting data to the printer 15. The FAX unit 8 and printer controller 9 are connected optionally.

Figure 4:
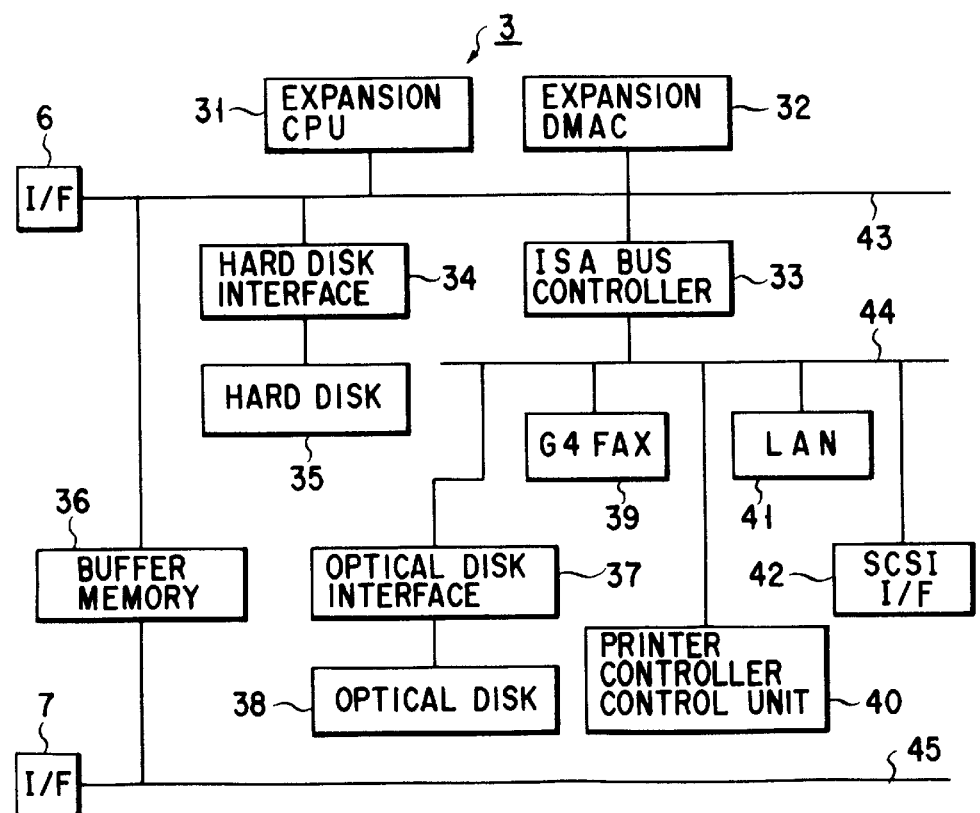
FIG. 4 is a block diagram of a system expansion unit of the embodiment.

The system expansion unit 3, as shown in FIG. 4, comprises an expansion CPU 31 that controls each of the other devices within the unit 3 via an expansion system device 43, an expansion DMA controller 32 that controls data transfer on the expansion section system bus 43, a general-purpose ISA bus 44, an ISA bus controller 33 that interfaces the expansion section system bus 43 with the ISA bus 44, storage means that is connected to the expansion section system bus 43 and electronically stores image data, such as a hard disk unit 35, a hard disk interface 34 for the storage means, storage means that is connected to the ISA bus 44 and optically stores image data, such as an optical disk unit 38, an optical disk interface 37 for the preceding storage means, a local area network channel control unit (LAN) 41 for achieving a LAN function, a printer controller control unit 40 for achieving a printer function, a G4 FAX control circuit 39 having a G4 FAX control function, an expansion SCSI interface 42 used to connect to a SCSI device, an expansion section image bus 45 that enables the printer controller control unit 40 to output image data to the system basic unit 2 via the expansion image interface 7, and a buffer memory 36 that interfaces when the expansion section system bus 43 exchanges data with the expansion section image bus 45.

The optical disk interface 37, optical disk unit 38, G4 FAX control circuit 39, printer controller control unit 40, local area network channel control unit 41, and expansion SCSI interface 42 are optional devices and can be installed in and removed from the system expansion unit 3.

The optical disk unit 38 is connected to the ISA bus 44 via the interface 37. The expansion CPU 31 controls the optical disk unit 38 via the expansion section system bus 43, ISA bus controller 33, and ISA bus 44, using a SCSI command.

The local area network channel control unit 41 comprises a channel control section that controls the communication of control data and image data with other devices on the network on the basis of the protocol of the connected network system, a common memory in which the communication control data and image data from the LAN or the control data and image data from the system expansion bus are temporarily stored, and a system expansion bus interface.

The printer controller control unit 40 comprises a parallel interface that exchanges control code and image data with a personal computer and conforms to a centronics interface, a system expansion image bus interface that interfaces with the system expansion section image bus 45 for transferring the bit image data to the page memory 28 of the system basic unit, an image data transfer control section that controls transfer of image data in the apparatus, control means that interprets the control code from a personal computer and tells the control information to the expansion CPU 31 via the expansion section system bus 43 and ISA bus 44 or that interprets the print control code from a personal computer, converts it into bit information, and then stores the bit information in the memory of the apparatus, and a system expansion bus interface that interfaces with the ISA bus 44.

The configuration and function of the important portion of the system basic unit 2 will be explained in detail.

Figure 6:
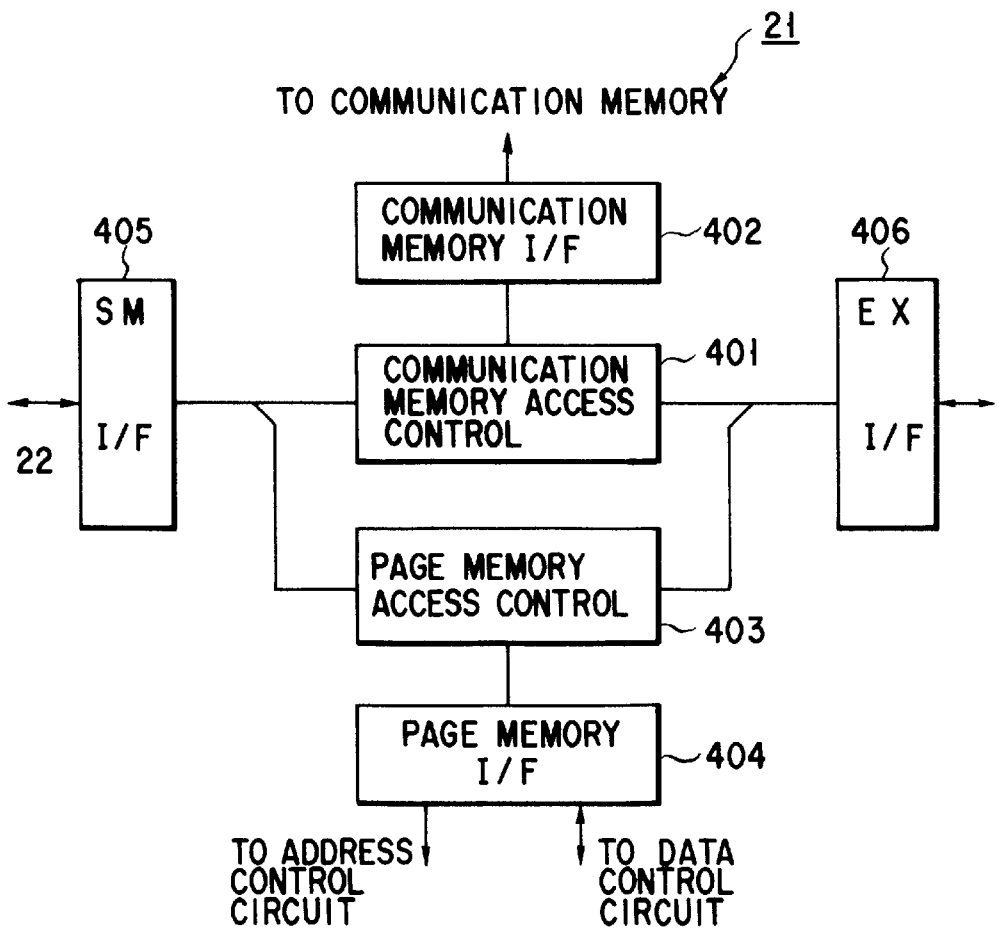
FIG. 6 is a block diagram of the system control circuit of FIG. 3.

The system control circuit 21, as shown in FIG. 6, comprises a communication memory access control circuit 401 that controls the communication of control information between the system CPU 11 and the expansion CPU 31, a communication memory interface 402 that interfaces with the communication memory 25, a page memory access control circuit 403 that controls the accessing of the basic unit 1 and system expansion unit 3 to the page memory 28, a basic section system bus interface 405 that decodes the address received together with the control information and image information sent from the system CPU 11 of the basic unit 1 via the basic section system bus 16 and allocates the control information and image information to the relevant block in the system basic unit 2, a system expansion bus interface 406 that decodes the address received together with the control information and image information sent from the system expansion unit 3 and allocates the control information and image information to the relevant block in the circuit, and a page memory interface 404 that interfaces exchange of image data between the page memory access control circuit 403 and the page memory 28, when the means (the CPU 11 and DMA controller 23 in the basic unit) capable of page memory accessing on the basic section system bus 16 and the means (the CPU 31 of the system expansion unit 3 and the DMA controller 32) capable of page memory accessing on the system expansion bus 43 each access the image information in the page memory 28 via the system bus.

The communication memory access control circuit 401 controls the accessing of the communication memory 25 when the CPU 11 of the basic unit 1 and the CPU 31 of the system expansion unit 3 exchange control code with the communication memory 25 via the communication memory interface 402 in the system control circuit 21.

The communication memory 25 has been mapped in the memory space of the CPU 11 of the basic unit 1 and that of the CPU 31 of the system expansion unit. When each CPU accesses a particular area, it can read the data from and write the data into the communication memory 25.

Figure 7:
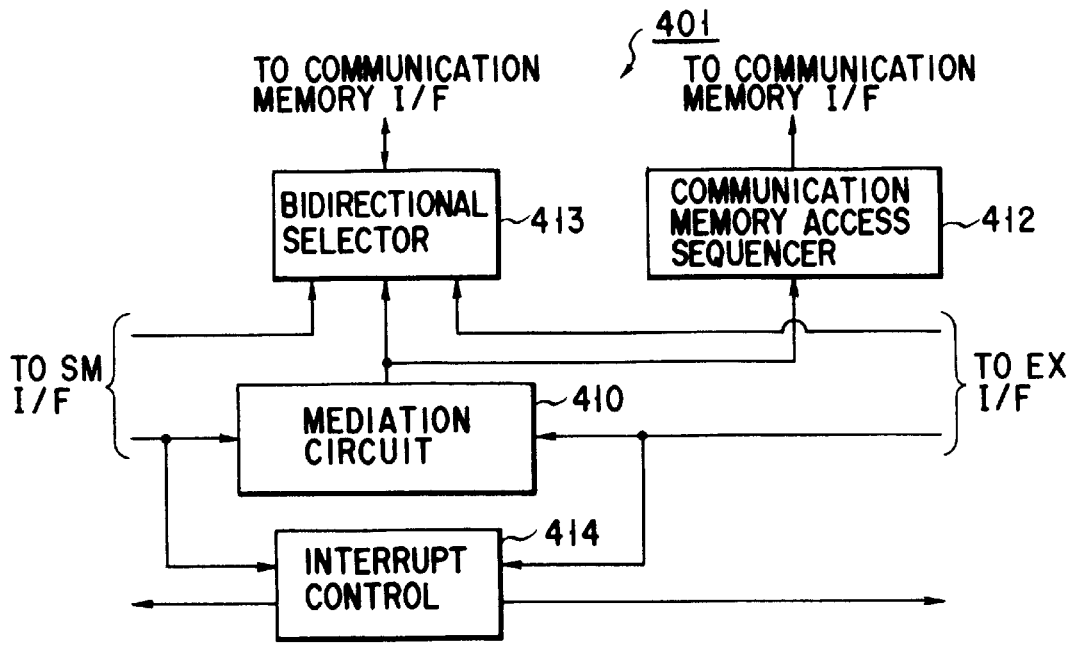
FIG. 7 is a block diagram of the communication memory access control circuit of FIG. 6.

The communication memory access control circuit 401, as shown in FIG. 7, comprises a mediation circuit 410, a communication memory access sequencer 412, a bi-directional selector 413, and an interrupt control circuit 414.

The mediation circuit 410 provides communication memory access priority control of the CPU 11 of the basic unit 1 and the CPU 31 of the system expansion unit 3. When the CPU 11 of the basic unit 1 and the CPU 31 of the system expansion unit 3 have accessed the communication memory 25 at the same time, the mediation circuit 410 allows one to access the memory and forces the other to wait for access. When the mediation circuit 410 has received an access request from the other CPU while one CPU is accessing the communication memory 25, it forces the other CPU to wait for access. The communication memory access sequencer 412 outputs a read or write control signal to the communication memory 25 on the basis of the request of the allowed CPU.

On the basis of the mediation result, the bi-directional selector 413 supplies to the communication memory 25 the address in the communication memory 25 outputted from the allowed control means, in synchronization with the timing signal outputted from the communication memory access sequencer 412. In a write operation, the selector supplies to the communication memory 25 the communication information (data) outputted together with the address from the allowed CPU as well as the address information. In a read operation, the selector receives the address in the communication memory 25 from the allowed CPU and the communication information read from the communication memory 25 in synchronization with the timing signal outputted from the communication memory access sequencer 412, and supplies them to the allowed CPU.

Figure 8:
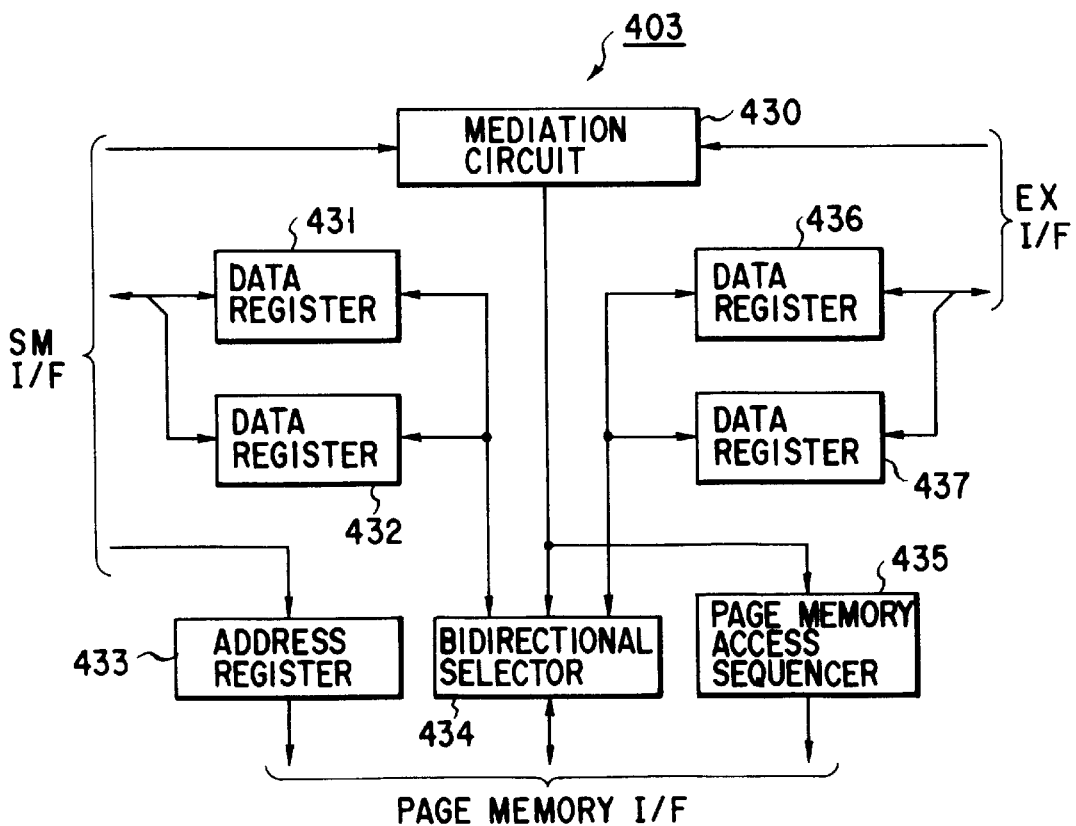
FIG. 8 is a block diagram of the page memory access control circuit of FIG. 6.

The page memory access control circuit 403, as shown in FIG. 8, comprises a mediation circuit 430, data registers 431, 432, 436, 437, an address register 433, a bi-directional selector 434, and a page memory access sequencer 435.

The mediation circuit 430 provides page memory access priority control of the CPU 11 of the basic unit 1 and the CPU 31 of the system expansion unit 3. When the CPU 11 and the CPU 31 have accessed the page memory 28 simultaneously, the mediation circuit 430 allows one CPU to access the page memory according to the priority given to them and forces the other CPU to wait for access.

On the basis of the request of the allowed CPU, the page memory access sequencer 435 outputs to the address control circuit 26 a control signal for reading or writing the data from or into the page memory 28.

On the basis of the mediation result of the mediation circuit 430, the bidirectional selector 434 supplies to the address control circuit 26 the address in the page memory 28 outputted from the allowed CPU, in synchronization with the timing signal outputted from the page memory access sequencer 435. In a write operation, the selector supplies to the data control circuit 27 the information (data) outputted together with the address from the allowed CPU as well as the address information. In a read operation, the selector receives via the data control circuit 27 the address in the page memory 28 from the allowed CPU and the information (data) read from the page memory 28 in synchronization with the timing signal outputted from the page memory access sequencer 435, and supplies them to the allowed CPU.

The data register 431 and data register 432 are registers that temporarily store the data when the basic unit 1 accesses the page memory 28. The address register 433 is a register that temporarily stores the address in the page memory 28 outputted from the basic unit 1.

When the basic unit 1 accesses the page memory 28 using the data register 431, the address outputted from the basic unit 1 is temporarily stored in the address register 433 and then outputted to the page memory 28 via the address control circuit 26. In contrast, the basic unit 1 accesses the page memory using the data register 432, the address outputted from the basic unit 1 is ignored and the address generator section of the address control circuit 26 outputs an address to the page memory 28 on the basis of the setting information.

The data register 436 and data register 437 are registers that temporarily store the data when the system expansion unit 3 accesses the page memory 28. When the system expansion unit 3 accesses the page memory 28, the address generator section of the address control circuit 26 outputs addresses to the page memory 28 on the basis of the setting information.

The system DMA controller 23 of the system basic unit 2 is a controller for transferring the data between devices on the basic section system bus 22 at high speeds from the viewpoint of hardware, without intervention of the CPU 11 of the basic unit 1.

The processes of transferring data by the use of the system DMA controller 23 include the transferring of compressed data (coded data) between the page memory 28 and the FAX unit 8 in the FAX transmitting/receiving process, the transferring of image data between the page memory 28 and the control panel 12 to display the image in the page memory 28 at the control panel 12, and the transferring of data between the system memory 24 and the control panel 12 to display an operation screen at the control panel 12.

Figure 9:
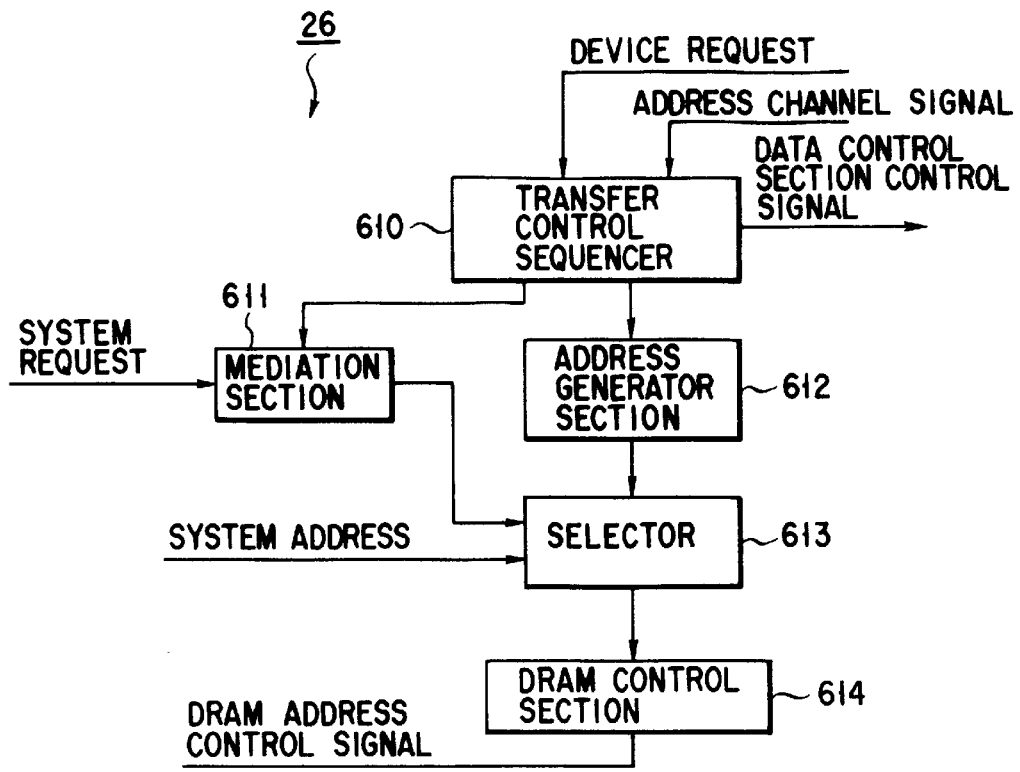
FIG. 9 is a block diagram of the address control circuit of FIG. 3.

The address control circuit 26 that generates addresses in the page memory 28, as shown in FIG. 9, comprises a transfer control sequencer 610 that executes various types of transfer sequence according to the request from the image bus, a mediation section 611 that mediates between a request for use of image bus and a request for use of system bus, an address generator section 612 that generates various memory addresses in a plurality of channels in transferring from the image bus, a selector 613 that switches between the addresses outputted from the address generator section 612 and the system addresses, and a DRAM control section 614 that generates addresses in the DRAM and its control signals.

The address control circuit 26 accepts memory access requests from the two routes of the image bus and the system bus. These requests are arbitrated at the mediation section 611 and the data transfer process on the bus given priority over the other is performed.

When the system bus' request has been given priority, the system address selected by the selector 613 is inputted to the DRAM control section 614. The DRAM control section 614 not only converts the entered address into an address in the DRAM, but also generates the control signal necessary for reading and writing.

The transfer control sequencer 610, to which the request, together with the address channel signal, is inputted from the image bus, selects one of the address generators in the address generator section 612. When the image bus' request has been given priority, the memory address in the selected channel is outputted from the address generator section 612 and inputted to the DRAM control section 614.

Figure 10:
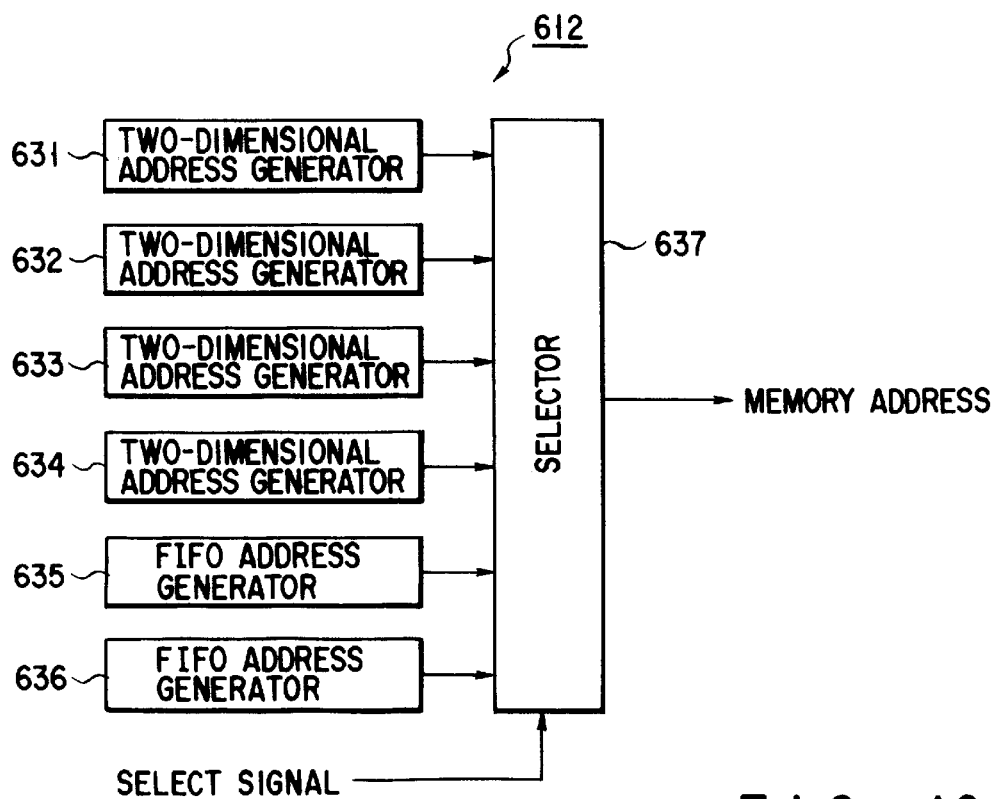
FIG. 10 is a block diagram of the address generator section of FIG. 9.

The address generator section 612, as shown in FIG. 10, comprises four channels of two-dimensional address generators 631, 632, 633, 634, and two channels of FIFO address generators 635, 636, and a selector 637 that selects one of the generated memory addresses according to the channel select signal from the transfer sequencer.

The two-dimensional address generators 631 to 634 can generate various types of addresses. For example, as shown in FIG. 11A, they can generate addresses one after another in the X direction in synchronization with the clock from the transfer control sequencer. Furthermore, by changing parameters, they can generate addresses sequentially in the direction opposite to the Y direction as shown in FIG. 11B. In addition, the start address or the main scanning width (XW) of a single line can be set arbitrarily according to the size of a sheet of manuscript paper.

Use of the two-dimensional address generators that can generate various types of addresses enables the transfer of data to a given rectangular area in the page memory 28, rotational reading, and repetitive reading. Furthermore, use of two channels of two-dimensional address generators enables image editing, including the movement of an image between any areas in the page memory 28, the rotation of an image, length-to-breadth conversion, repetition, and mirror image.

The FIFO address generators 635, 636 generate FIFO addresses for using the page memory 28 as a FIFO memory and the statuses necessary for FIFO control. The statuses include FIFO full (the status where the FIFO area is full of unread data) and FIFO empty (the status where the FIFO area has no unread data). By reading the contents from the FOFO register, the amount of data in the FIFO and the empty capacity can be known.

By performing FIFO control using these statuses, it is possible to absorb the difference in transfer speed or transfer timing when the data is transferred from one device to another on the image bus 29 or from a device on the image bus 29 to the system bus 22, enabling high-speed data transfer. The FIFO address generators 635, 636 can be used as a one-dimensional address generator for two channels for a single channel (a single circuit) when FIFO control is not performed.

A detailed configuration of the FIFO address generators 635, 636 will described by reference to FIG. 12. Each FIFO address generator is composed of one-dimensional address generator channels A4601 and B4603, start address setting units A4602 and B4604 that give start addresses to the one-dimensional address generators, respectively, an FIFO status generator 4605, and an FIFO area size setting unit 4606.

The one-dimensional address generator 4601 is counted up by a count-up signal each time a transfer has ended. This makes it possible to write or read the data into or from consecutive addresses in the memory.

The address generators 635, 636 have two modes: one mode in which consecutive one-dimensional addresses are generated, and the other mode in which addresses are generated so as to make a loop in such a manner that when addresses are generated, starting at the start address, and reach the size of the FIFO area, then the address is returned to the start address in the next transfer.

In the FIFO address mode, one channel has a write address generated for FIFO control and the other channel has a read address generated for FIFO control.

The FIFO status generator generates a status indicating the statuses of the data in the FIFO area on the basis of the addresses of the two channels and the size of the FIFO area. The statuses include two statuses: FIFO full and FIFO empty.

FIFO full indicates the status in which the FIFO area is full of unread data. Since data cannot be written in any more, the writing of data is inhibited using the FIFO full signal.

FIFO empty indicates that the FIFO area has no unread data and data cannot be read any more, so that the reading of data is inhibited by using the FIFO empty signal.

Thus, by performing transfer control in the FIFO address mode, part of the memory can be used as the FIFO area to absorb the difference in speed between the reading and writing operations, thereby enabling high-speed data transfer.

FIG. 13 is a conceptual diagram for two-dimensional access to the page memory 28.

If the width of an access to the page memory 28 (in the figure, 64 bits) is a column, a line will consist of an integral multiple of a column. Consecutive columns in the X direction in the same line have consecutive linear addresses in the page memory 28, with the linear address of the last column in the line and that of the first column in the next line being consecutive.

Figure 14:
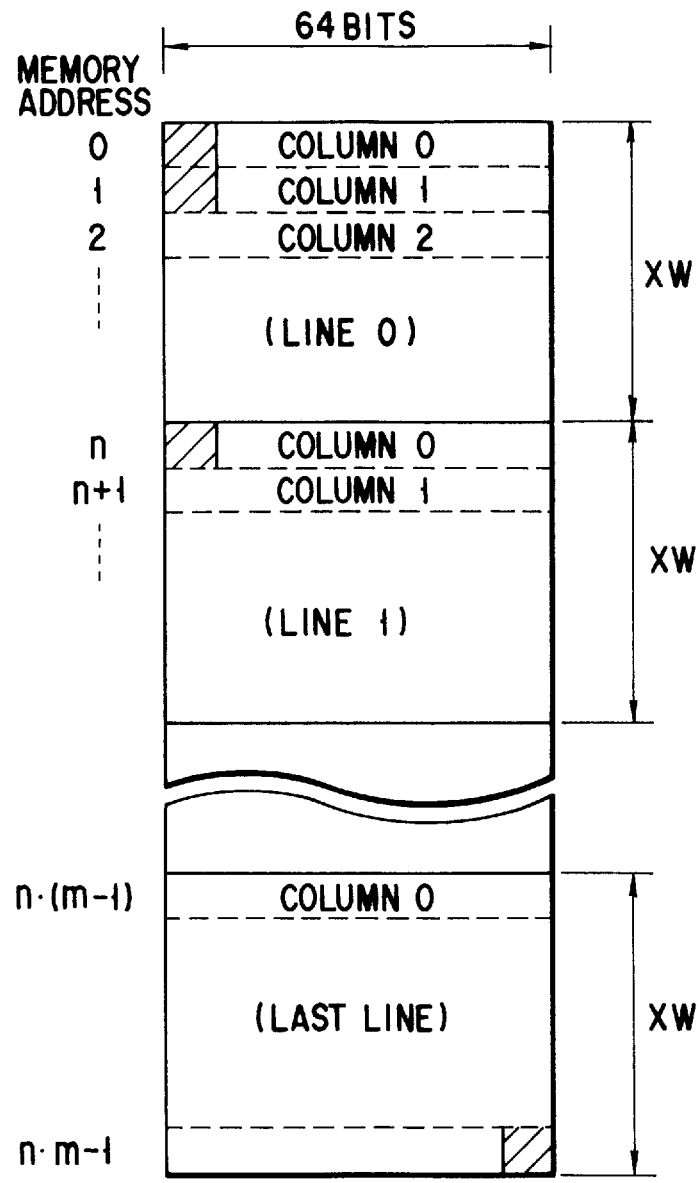
FIG. 14 shows two-dimensional access to the page memory of FIG. 3 using linear addresses.

FIG. 14 illustrates the two-dimensional memory of the page memory 28 of FIG. 13 using linear addresses.

The data control circuit 27, as shown in FIG. 15, comprises an image data transfer control section 701 that controls data transfer between devices on the image bus 29 in the system basic unit 2 and data transfer between devices on the image data bus 29 and the page memory 28, an image processing section 702 that executes bit block transfer and various raster operations (logical operations), a system interface 703 that interfaces data when the CPU 11 of the basic unit 1 or the CPU 31 of the system expansion unit 3 accesses (reads and writes from and into) the page memory 28 via the system control circuit 21, a selector 704 that selects either the data on the image bus 29 transmitted via the image data transfer control section 701 or the data from the CPU (the CPU 11 of the basic unit 1 or the CPU 31 of the system expansion unit 3) via the system interface 703, on the basis of the page memory access mediation result of the address control circuit 26 in writing the data into the page memory 28, and a selector 705 that selects either the sending of the data to the image bus 29 via the image data transfer control section 701 or the sending of the data to the CPU (the CPU 11 of the basic unit 1 or the CPU 31 of the system expansion unit 3) via the system interface 703, on the basis of the page memory access mediation result of the address control circuit 26 in reading the data from the page memory 28.

Explained next will be the control operation of the image data transfer control section 701 shown in FIG. 15. The image data transfer modes that the image data transfer control section 701 controls are the following two.

One mode is data transfer between I/O devices on the image bus 29 in the system basic unit 2, with both the source (the device transferring the data) and the destination (the device receiving the data) on the image bus 29, and is composed of two cycles: a read cycle in which the data is loaded from the source into the data buffer in the image data transfer control section 701 and a write cycle in which the data on the data buffer is written into the destination.

The other mode is data transfer between I/O devices on the image bus 29 in the system basic unit 2 and the page memory 28 and is made up of two cycles: a data transfer cycle in which the data is transferred between an I/O device and the data buffer in the image data transfer control section 701 and a data transfer cycle in which the data is transferred between the data buffer and the page memory 28.

Since the section between the page memory 28 and the data buffer is independent of the image bus 29, the two cycles can operate in parallel. The image data transfer control section 701 can specify two modes of data transfer for eight channels and transfer data in eight channels at the same time.

The image data transfer control section 701, as shown in FIG. 16, comprises a data buffer 740, an image bus priority control section 741, a transfer control sequencer 742, a page memory priority control section 743, a page memory timing control section 744, a terminal counter 745, an interrupt control section 746, a control bus interface 747, a parameter register 748, and an I/O buffer 749.

The data buffer 740 has as many data registers for temporarily storing the data from the source in data transfer as there are channels. The image bus priority control section 741 receives a data transfer request (REQ) from a device on the image bus 29, determines a device allowed to transfer data by specific priority control, tells the allowed device that it is allowed to start data transfer.

The transfer control sequencer 742 generates a timing signal of data transfer between the source device determined on the basis of the priority control result of the image bus priority control section 741 and the destination device, and outputs the timing signal to the image bus 29. The page memory priority control section 743 receives the request signal outputted from the data buffer 740 and determines a data transfer channel between the page memory 28 and the data buffer 740 on the basis of specific priority.

The page memory timing control section 744 generates a timing signal of data transfer between the page memory 28 in the transfer channel determined on the basis of the priority control result of the page memory priority control section 743 and the data buffer 740, and outputs the timing signal to the address control circuit 26. In the process of writing the data into the page memory 28, the transfer request signal from the data buffer 740 is outputted to the page memory priority control section 743 in the state where the data from a device on the image bus 29 is stored in the data buffer 740, whereas in the process of reading the data from the page memory 28, the transfer request signal is outputted to the page memory priority control section 743 when no data is stored in the data buffer 740. The parameter register 748 is a register in which the following items are set for each transfer channel: the device transferring the data, the device receiving the data, the number of bytes transferred, and the presence or absence of an interrupt process after the completion of transfer.

The image bus 29 has a data width of 32 bits and always performs 32-bit data transfer, regardless of a bit width of a single pixel. For instance, when binary (a bit/pixel) data is written from the scanner 13 into the page memory 28, the 32-pixel data is transferred from the image data I/F 210 to the page memory 28 at a time on the image bus 29 via the image data transfer control section 701. In addition, when multivalued data (four bits/pixel) is written into the page memory 28, data of eight pixels is transferred at a time on the image bus 29. Converting data into 32-bit data is effected according to the number of bits per pixel at each device on the image bus 29.

Data transfer priority control on the image bus 29 is such that priority is determined on the basis of the nature of a device in such a manner that a transfer request from a device which can neither stop data transfer in the middle nor wait for data transfer as found in the process of outputting data to the printer or the process of inputting data from the scanner, is allowed preferentially, and that a transfer request from a device which can wait for data transfer as found in the compression/expansion process or the resolution conversion process, is allowed only when there is no transfer request from a device with a higher priority level.

A timer 900 is connected to the system bus 16 of FIG. 2. The timer 900 is composed of a timer control section 901, a reference clock generator circuit 202, a reference clock frequency demultiplier 903, and a down counter 904.

The timer control section 901 sets a frequency division ratio in the reference clock frequency demultiplier 903 and controls the start and stop of counting at the down counter 904. Additionally, the timer control section 901 can generate an interrupt signal to the system CPU 11 in response to the carry down signal outputted from the down counter 904.

The reference clock generator circuit 902 generates an accurate 25-MHz square wave using a crystal oscillator. On the basis of the setting from the system CPU 11, the reference clock frequency demultiplier 903 divides the reference clock into a frequency of 1/n at frequency ratios ranging from 1/1 to 1/65536.

The down counter 904 is a 32-bit binary down counter, which counts down in synchronization with the frequency division clock. The initial value of the down counter 904 is set by the system CPU 11 via the system bus 16.

When a carry-down (carrying down from 0) takes place in the down counter 904, the preceding initial value set by the system CPU 11 is set automatically. The value in the down counter 904 can be read from the system CPU 11 any time via the system bus 16. The start and stop of counting down at the down counter 904 are controlled by the count enable signal outputted from the timer control section 901.

A detailed configuration of the image bus priority control section 741 of FIG. 16 will be explained by reference to FIG. 18. The image bus priority control section 741 comprises an image bus transfer request mediation section 910, request mask circuits 911 for eight channels, and request generator sections 912 for eight channels.

An image bus transfer request signal and a channel buffer status are inputted to each of the request generator sections 912, which are independent of each other, one transfer channel to another. When the conditions for the two are fulfilled, an internal valid transfer request is generated. The image bus transfer request signal is a signal made active when a device connected to the image bus 29 requests data transfer on the image bus 29. The channel buffer status is a signal indicating the state of the data buffer 740 for data exchange in each transfer channel and has two states: an "empty" state in which no effective data is in the data buffer in the channel and a "full" state in which effective data is in the data buffer.

In the case of device read transfer from a device on the image bus 29 to the data buffer 740, when the status of the data buffer in the channel to which the data is to be transferred is "empty" and the request signal from the device to the channel is active, an internal valid transfer request is generated by the request generator section 911.

In the case of device write transfer from the data buffer 740 to the image bus, when the data buffer in the channel to which the data is to be transferred has valid data, the buffer status is "full", and the request signal from the device to the channel is active, a valid transfer request is generated by the request generator section 912.

The request mask circuit 911 determines whether or not the transfer request generated at the request generator section in the preceding stage is made valid. The transfer channel enable determines whether or not transfer through the channel is permitted.

The TC mask is for transfer amount control and sets the number of words to be transferred in the terminal counter 745 in advance. After a specified number of words has been transferred, the TC mask becomes active, inhibiting transfer through the channel. When the transfer amount control is not performed, the setting is done so that the TC mask may always be inactive.

The FIFO control mask determines whether or not transfer through the channel is permitted in performing FIFO control. When the FIFO control mask is active, this inhibits transfer; and when the mask is inactive, this permits transfer.

On the basis of the setting from the system CPU 11, it is determined whether FIFO control is effected according to the FIFO status from the FIFO address generators 635, 636 or to the comparison result of the transfer comparator in the terminal counter 745, or FIFO control is not performed.

When FIFO control is not effected, the FIFO control mask is always made inactive by the setting.

The image bus transfer request mediation section 910 arbitrates transfer requests in eight channels generated at the request mask circuit 911, chooses one channel, and outputs to a device in the selected channel an image bus transfer acknowledge signal that indicates that the request has been accepted and transfer has been permitted. The device that has received the acknowledge signal performs data transfer on the image bus 29.

Mediation priority control effected when transfer requests have occurred in a plurality of channels is based on round robin scheduling control in which the priority level of the channel through which the last transfer has been performed is the lowest, with the channel 1 to channel 8 arranged in a ring. Thus, even if all of the eight channels are making requests, each channel is allowed equally to perform transfer because a turn to transfer never fails to come to each channel until eight transfers have been completed.

Now, a detailed configuration of the page memory priority control section 743 of FIG. 16 will be described by reference to FIG. 19. The page memory priority control section 743 is composed of the page memory transfer request mediation section 921, request mask circuits 922 for eight channels, and request generator sections 923 for eight channels.

A channel buffer status is inputted to each of the request generator sections 923, which are independent of each other, one transfer channel to another. When the condition for the channel buffer status is fulfilled, an internal valid transfer request is generated.

The channel buffer status is a signal indicating the state of the data buffer 740 for data exchange between the individual transfer channels and has two states: an "empty" state in which the data buffer in the channel has no valid data and a "full" state in which the data buffer has valid data.

In the case of memory read transfer from the page memory 404 to the data buffer 740, when the status of the data buffer in the channel to which the data is to be transferred is "empty", that is, data exchange is possible, an internal valid transfer request is generated by the request generator section.

In the case of memory write transfer from the data buffer 740 to the page memory 404, when the data buffer in the channel to which the data is to be transferred has valid data and the buffer status is "full", an internal valid transfer request is generated by the request generator section 923.

The request mask circuit 922 determines whether or not the transfer request generated at the request generator section in the preceding stage is made valid. The transfer channel enable determines whether or not transfer through the channel is permitted.

The TC mask is for transfer amount control and sets the number of words to be transferred in the terminal counter 745 in advance. After a specified number of words has been transferred, the TC mask becomes active, inhibiting transfer through the channel. When the transfer amount control is not performed, the setting is done so that the TC mask may always be inactive.

The FIFO control mask determines whether or not transfer through the channel is permitted in performing FIFO control. When the FIFO control mask is active, this inhibits transfer; and when the mask is inactive, this permits transfer.

On the basis of the setting from the system CPU 11, it is determined whether FIFO control is effected according to the FIFO status from the FIFO address generators 635, 636 or to the comparison result of the transfer comparator in the terminal counter 745, or FIFO control is not performed. When FIFO control is not effected, the FIFO control mask is always made inactive by the setting.

The page memory transfer request mediation section 921 arbitrates transfer requests in eight channels generated at the request mask circuit 922, chooses one channel, and outputs to the address control section 26 a select signal (RCHN) for the address generator set in the selected channel.

Mediation priority control effected when transfer requests have occurred in a plurality of channels is based on round robin scheduling control in which the priority level of the channel through which the last transfer has been performed is the lowest, with the channel 1 to channel 8 arranged in a ring. Thus, even if all of the eight channels are making requests, each channel is allowed equally to perform transfer because a turn to transfer never fails to come to each channel until eight transfers have been completed.

Now, a detailed configuration of the terminal counter 745 of FIG. 16 will be explained by reference to FIG. 20. The terminal counter 745 counts the number of words transferred for each channel and is made up of a count down generator section 931, number-of-transferred-words counters 932 for eight channels, four number-of-transfers comparators each connected to two channels.

The count down signal generator 931 outputs a count down signal to the number-of-transferred-words counter 932 for the selected channel according to the transfer channel signal on the basis of the mediation result at the image bus priority control section 741 and the transfer end signal.

The number-of-transferred-words counter 932 is a 32-bit binary down counter which is counted down each time a single transfer in the channel on the image bus 29 has ended. The initial value in the counter 745 is set by the system CPU 11 via the system bus 16. When a carry-down (carrying down from 0) has taken place, a terminal count signal is outputted. The value of the number-of-transferred-words counter 932 can be read from the system CPU 11 any time via the system bus 16.

The interrupt mask circuit 934 permits the terminal count signals for eight channels to interrupt the system CPU or inhibits the terminal count signals from interrupting the system. The interrupt mask circuit ORs the terminal count signals into a single signal and outputs the resulting signal as a terminal count interrupt signal. The setting of permitting or inhibiting each channel is effected by the system CPU 11.

The number-of-transfers comparator 933 compares the number of transferred words in two channels and, when these numbers are equal, makes the output active as the comparison result. The comparison result is used as a control signal in performing FIFO control between the two channels.

Hereinafter, the operation of the embodiment of the present invention constructed as described above will be explained. First, the basic operation of inputting the image data from the scanner 13 to the page memory 28 will be described. The image output data with 8 bits/pixel on a manuscript read by the scanner 13 is transferred to the image data interface 210 in the form of scanner image data with 8 bits/pixel, 4 bits/pixel, 2 bits/pixel, or 1 bit/pixel via the image processing circuit 14. The image data interface 210 collects pixels (4, 8, 16, and 32 pixels) of the scanner image data and performs DMA transfer of these data items as transfer data to the data control circuit 27 in units of 32 bits via the image bus 29. The data control circuit 27 writes the 32-bit scanner image data into an address in the page memory 28 generated at the address control circuit 26.

Now, the process of compressing image data on the page memory 28 will be explained. The page memory 28 is logically divided into an image area in which image data is stored and a code area in which compressed code data is stored.

The following two channels are set as transfer paths in the image data transfer control section 701: one channel for the image input from the image area in the page memory 28 to the compression/expansion circuit 211 and the other channel for the code output from the compression/expansion circuit 211 to the code area of the page memory 28. By determining the destination to which the code output is transferred to be the hard disk interface 34 or the optical disk interface 37, a large amount of images can be recorded on a recording medium whose unit price per bit is lower.

After the various settings of the compression process have been made in the compression/expansion circuit (coding/decoding means) 211, the coding start instruction is executed. The image data is read from the page memory 28 and inputted to the compression/expansion circuit 211. The compression/expansion circuit 211 codes the image and outputs the codes to the code area of the page memory 28.

Now, the process of expanding the coded image data into the page memory 28 will be explained. The following two channels are set as transfer paths in the image data transfer control section 701: one channel for the code input from the code area in the page memory 28 to the compression/expansion circuit 211 and the other channel for the image output from the compression/expansion circuit 211 to the image area of the page memory 28. By determining the device from which the code input is transferred to be the hard disk interface 34 or the optical disk interface 37, a large amount of images stored in a recording medium whose unit price per bit is lower can be recorded. After the various settings for the expansion process have been made in the compression/expansion circuit 211, a decoding start instruction is executed.

The code data is read from the page memory 28 and inputted to the compression/expansion circuit 211. Then, the compression/expansion circuit 211 decodes the images and outputs the image data to the image area of the page memory 28.

Now, the process of outputting the data from the page memory 28 to the printer 15 will be described. First, the image data is outputted from the page memory 28 to the printer 15. After the image data in units of 32 bits specified by the address in the page memory 28 generated at the address control circuit 26 has been transferred to the data control circuit 27, it undergoes DMA transfer to the image data interface 210 via the image bus 29.

The image data interface 210 converts the 32-bit image data into image data with 4 bits/pixel, 2 bits/pixel, or 1 bit/pixel and transfers the converted data to the printer 15 via the image processing section 14.

As described above, the basic operations, including the operation of inputting the image from the scanner 13 to the page memory 28, the image data compression process on the page memory 28, the process of expanding the coded image data onto the page memory 28, and the operation of outputting the data from the page memory 28 to the printer 15, are performed.

Now, electronic sorting will be described by reference to FIGS. 21 and 22. Electronic sorting is such that a plurality of manuscripts to be sorted are read and temporarily stored in an auxiliary storage device, such as a semiconductor memory, a hard disk, or an optical disk, and as many pages of the stored images as needed are outputted in arbitrary sequence. This makes it possible to arrange the sequence of pages of print output by outputting later inputted pages earlier or output copies of the documents in ascending order of pages. FIG. 22 illustrates an example of electronic sorting. When four manuscripts are inputted sequentially as shown in the figure, the necessary number of copies are outputted, starting with the last inputted manuscript. Because sheets of paper on which later inputted manuscripts have been printed are stacked earlier in the case of group output, the sheet of paper on which the first inputted manuscript has been printed is laid on the top of the stack. On the other hand, in the case of sorting output, a copy of the manuscripts is outputted in the reverse order of the manuscript input. The series of operations are repeated as many times as the number of copies needed.

Figure 23A:
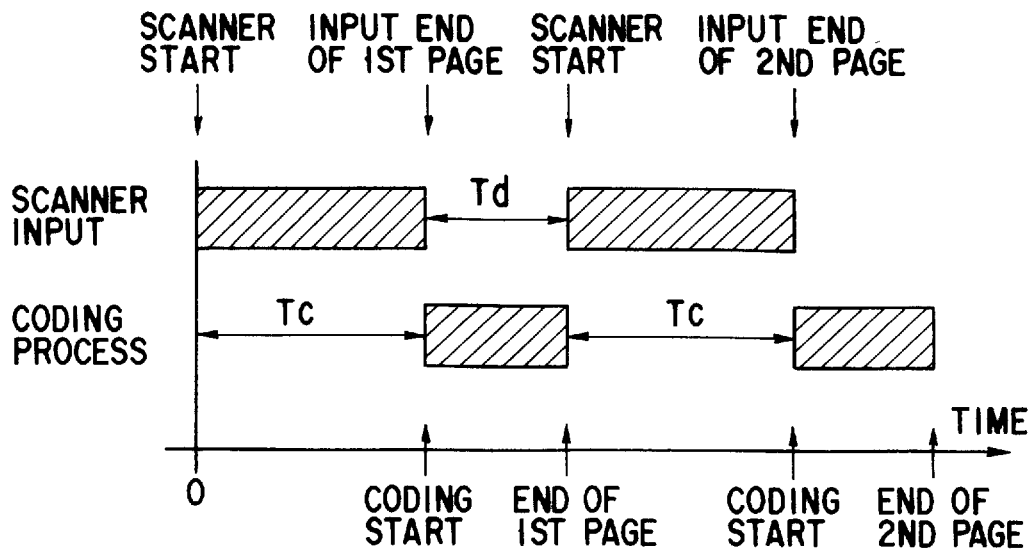
FIGS. 23A and 23B show a conventional scanner input, coding process, printer output, and decoding process.

Before explanation of the compression (coding)/expansion (decoding) operation according to the present invention, the compression/expansion operation in the prior art will be explained by reference to FIGS. 23A and 23B. FIG. 23A shows the timing for the scanner input and coding process. As shown in FIG. 23A, to code and store the image inputted from the scanner in a page of image memory in the prior art, after a page of image was inputted from the scanner into the image memory, coding was started. At the time when the coding of the page of image was completed, the scanner started to input the next page.

Specifically, since the scanner input and the coding process were performed alternately, the coding process was stopped during the scanner input, whereas the scanner input was stopped during the coding process. This produced a dead time Td during which scanner input was not effected at all and a dead time Tc during which the coding process was not effected at all, degrading the performance of the system.

Figure 23B:
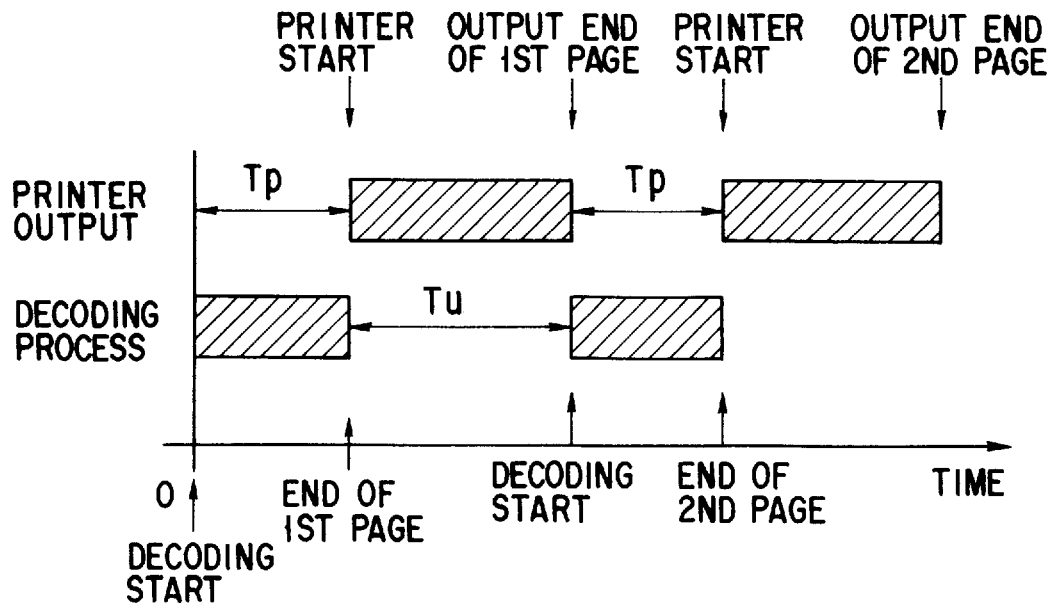

Referring to FIG. 23B, the printer output and decoding process will be explained. As shown in FIG. 23B, when the image stored in the form of codes using a page of image memory was decoded and outputted on the printer, the printer output was started after the completion of the decoding process for a page. After the printer output of the page of image finished, the decoding process of the next page was started.

Specifically, since the printer output and the decoding process were performed alternately, the decoding process was stopped during the printer output, whereas the printer output was stopped during the decoding process. This produced a dead time Tp during which printer output was not effected at all and a dead time Tu during which the decoding process was not effected at all, degrading the performance of the system.

With the present invention, to make the above-described dead times Td, Tc, Tp, and Tu as shorter as possible, the coding process and decoding process are started earlier. Such advance start can be controlled by software or hardware. The advance start of the coding and decoding processes by software control will be explained below.

First, the scanner input and coding process according to the present invention will be explained. With the invention, before a page of image data inputted from the scanner 13 have been all stored in the page memory 28, the coding process is started, thereby shortening the total processing time from the start of the scanner input of a page of image to the completion of the coding process.

Figure 24A:
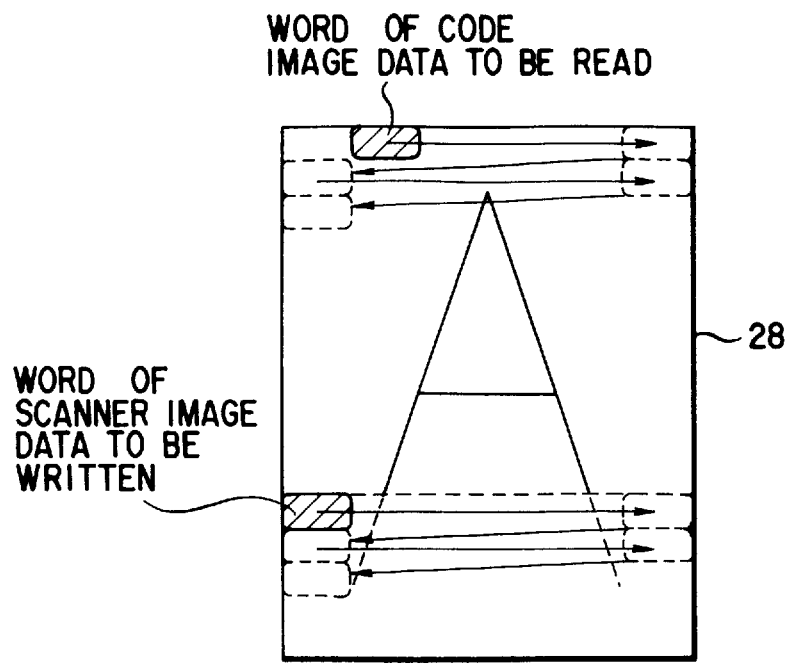
FIGS. 24A and 24B are diagrams to help explain the operation of accessing the page memory.

To start the coding process earlier as shown in FIG. 24A, the reading of coded image data must be controlled so as not to pass the writing of image data from the scanner 13 into the page memory 28. Here, the page memory 28 is a memory capable of writing and reading at the same time. If reading passes writing, the totally irrelevant images left in the image memory will be coded.

Figure 25A:
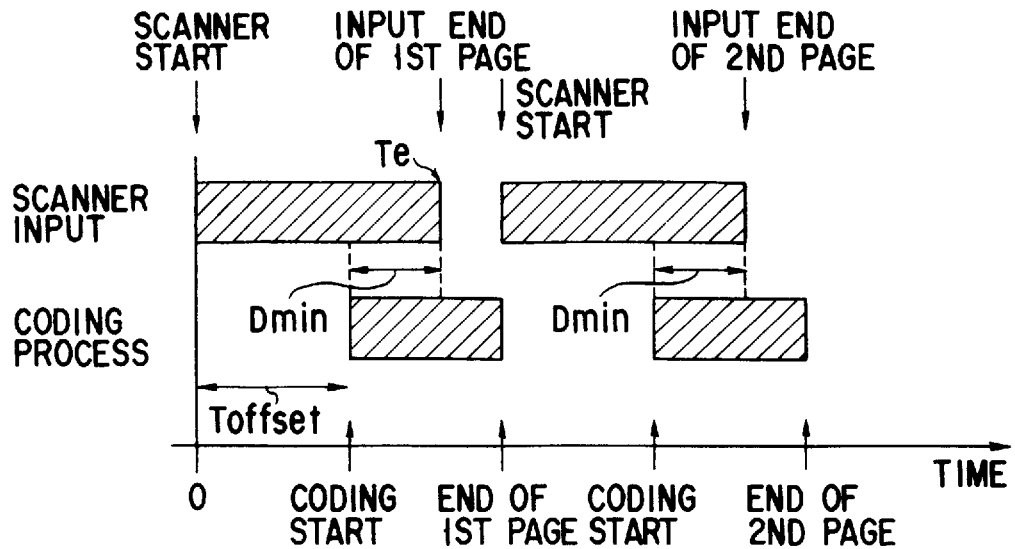
FIGS. 25A and 25B shows a scanner input, coding process, printer output, and decoding process by software control.

The conditions for preventing such passing will be explained by reference to FIG. 25A. In general, the time required for the coding process varies with the feature of an image. The shortest time required to code a page of an image among all the images is determined to be the minimum coding time Dmin (in most cases, the coding of white paper corresponds to this case). To prevent the coding process from passing the scanner input, the coding process is started at a point in time later than the scanner input end time Te minus the minimum coding time Dmin.

This prevents the coding process from ending before the scanner 13 has ended the input even if the coding process time is the minimum coding time Dmin. Therefore, it is possible to make the total processing time shorter than in a conventional sequential process by the minimum coding processing time Dmin. The scanner input of a second page is started after the coding process of the first page has ended. This is because the time required for each page to be coded is unknown and varies from page to page.

A first approach of preventing the coding process from passing the scanner input using software according to the above reasoning will be explained by reference to the flowchart of FIG. 26. In the flowchart of FIG. 26, the start timing of the coding process is determined by monitoring the number of words transferred from the scanner 13 to the page memory 28.

First, the minimum coding time for each image size and orientation (lengthways or widthways) of the manuscript, and the number (Ns) of words transferred from the scanner in a time interval between the scanner input start and the scanner input end time minus the minimum coding time are calculated in advance.

Then, as shown in FIG. 26, the reading of image data by the scanner 13 is started (step S1). Then, the number of words transferred from the scanner counted at the scanner-transferred-word-number counter 932 (see FIG. 20) is read (step S2) and it is judged whether or not the count has exceeded the number (Ns) of words transferred from the scanner (step S3). In the judgment at step S3, if the result is YES, that is, if the count has exceeded the number (Ns) of words transferred from the scanner, the coding process will be started (step S4).

Then, it is judged whether or not the coding process of a page has finished (step S5). In the judgment at step S5, if the result is YES, it will be judged whether or not any subsequent manuscript is present (step S6).

In the judgment at step S6, if the result is YES, control will return to step S1, where the scanner 13 will be started to read the next manuscript and load the image data into the page memory 28. In this way, the coded image data is stored in another area (code memory) in the page memory 28.

Figure 27:
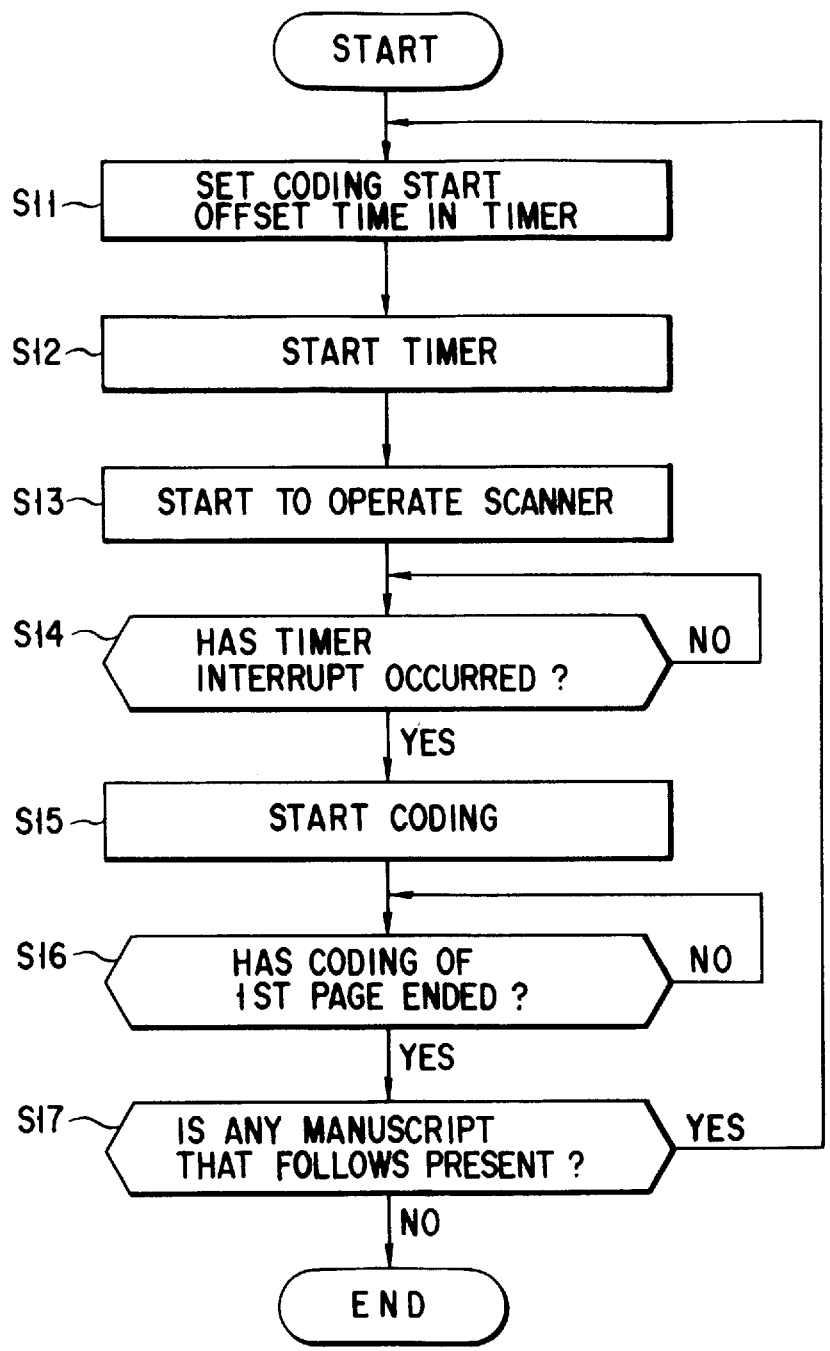
FIG. 27 is a flowchart for coding control.

Now, a second approach of preventing the coding process from passing the scanner input using software will be explained by reference to FIG. 25A and the flowchart of FIG. 27. In the flowchart of FIG. 27, the start timing of the process of coding the scanner image data stored in the page memory is determined from the time at which the scanner started to operate. First, the minimum coding time Dmin for each image size and orientation (lengthways or widthways) of the manuscript, and the time Toffset (coding start offset time) from the scanner input start time to the scanner input end time Te minus the minimum coding time Dmin are calculated in advance.

The coding start offset time Toffset is set in the down counter 904 (FIG. 17) of the timer 10 (step S11). Then, the timer 10 is started and at the same time, the image input process by the scanner 16 is started (steps S12, S13). The coding start offset time Toffset set in the down counter 904 is counted down in response to the frequency-divided clock. Then, after the coding start offset time Toffset has elapsed since the start of the scanner input, the timer 10 outputs an interrupt signal to the system CPU 11. The system CPU 11 judges whether or not any interrupt signal has occurred (step S14). In the judgment at step S14, if the result is YES, the coding process will be started under the control of the system CPU 11.

Then, it is judged whether or not the coding process of a page has been completed (step S16). In the judgment at step S5, if the result is YES, it will be judged whether or not any subsequent manuscript is present (step S17).

In the judgment at step S17, if the result is YES, control will return to step Sl, where the scanner 13 will be started to read the next manuscript and load the image data into the page memory 28. In this way, the coded image data is stored in another area (code memory) in the page memory 28.

Now, the printer output and decoding process according to the present invention will be described. In the invention, the total processing time from the start of the decoding process to the completion of the print output is shortened by starting the decoding process of the next page in the course of outputting a page of the coded image data stored in the page memory 28.

Figure 24B:
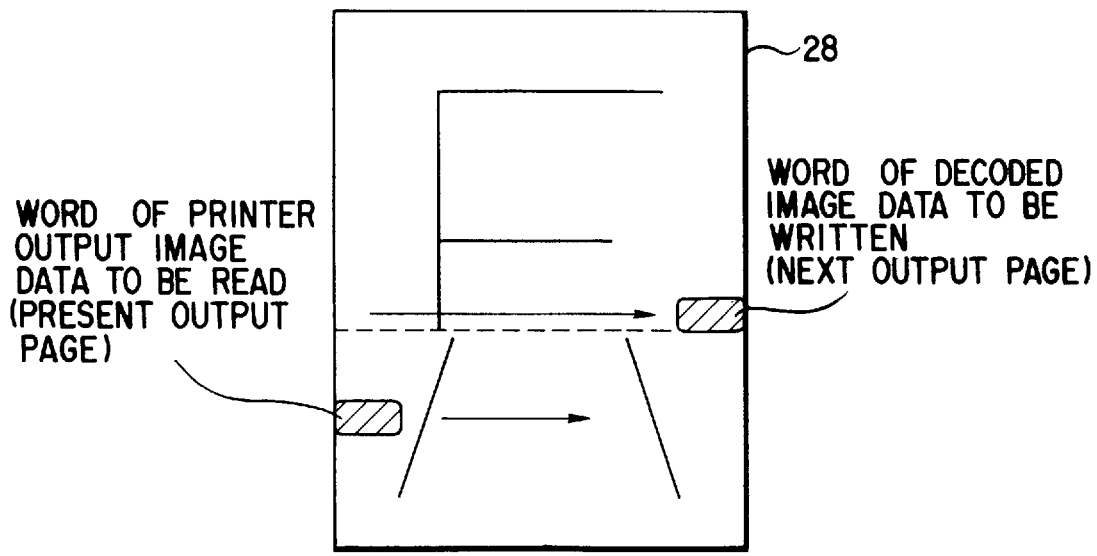

To start the decoding process earlier, the writing of decoded image data must be controlled so as not to pass the reading of image data from the page memory 28 onto the printer memory 15 as shown in FIG. 24B.

If reading passes writing, this will permit the decoded image data of the next page to be overwritten over the image data that has not been read yet, with the result that the image data to be outputted will be lost.

Figure 25B:
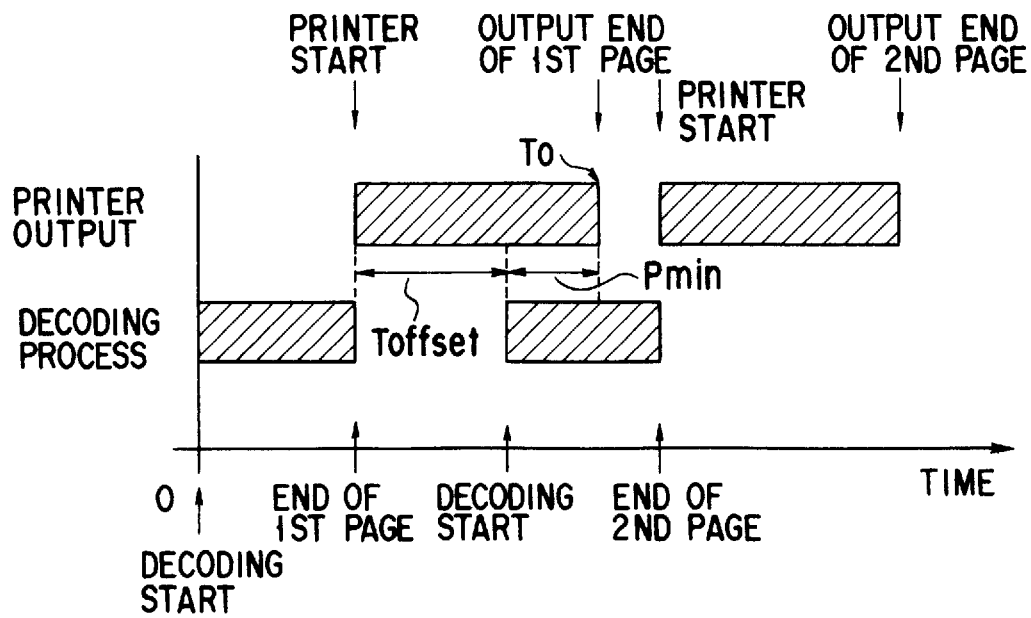

The conditions for preventing such passing will be explained by reference to FIG. 25B. In general, the time required for the decoding process varies with the feature of an image. The shortest time required to decode a page of an image among all the images is determined to be the minimum decoding time Pmin (in most cases, the decoding of white paper corresponds to this case). To prevent the decoding process from passing the printer output, the decoding process is started at a point in time later than the printer output end time To minus the minimum decoding time Pmin.

This prevent the decoding process from ending before the printer has ended the output even if the decoding process time is the minimum coding time Pmin. Therefore, it is possible to make the total processing time shorter than in a conventional sequential process by the minimum decoding processing time Pmin.

Figure 28:
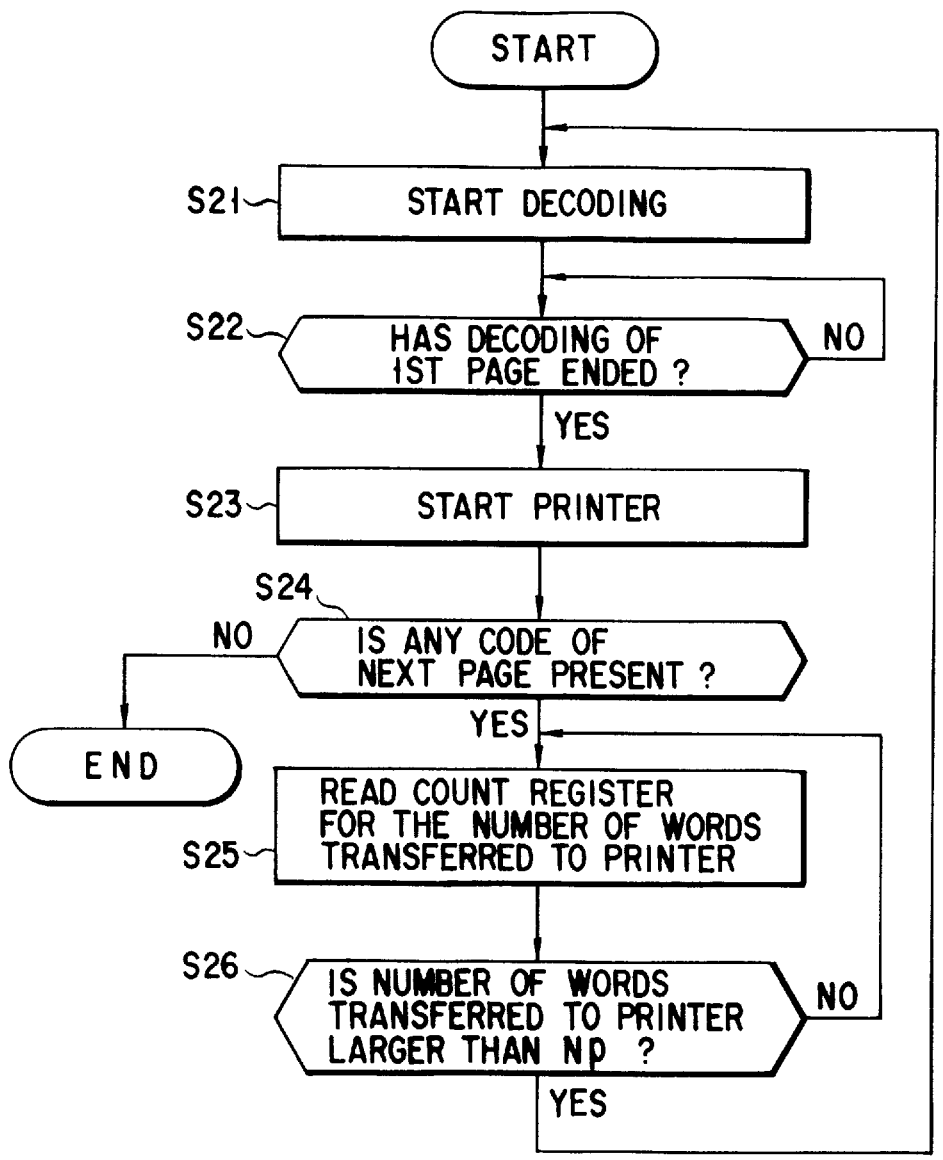
FIG. 28 is a flowchart for decoding control.

A first approach of preventing the decoding process from passing the printer output using software according to the above reasoning will be explained by reference to the flowchart of FIG. 28. In the flowchart of FIG. 28, the start timing of the decoding process is determined by monitoring the number of words transferred to the printer.

First, the minimum decoding time Pmin for each image size and orientation (lengthways or widthways) of the manuscript, and the number (Np) of words transferred to the printer in a time interval between the printer output start and the printer output end time To minus the minimum decoding time Pmin are calculated in advance.

As shown in FIG. 28, the compression/expansion circuit 211 is caused to start decoding the first page (step S21). Then, it is judged whether or not the decoding of a page of coded images stored in the code area of the page memory 28 has been completed (step S22). If it is judged that the decoding has been completed, the printer will be started (step S23).

Then, it is judged whether or not the code area of the page memory 28 has any code in it (step S24). In the judgment at step S24, if the result is NO, the process will be terminated because there is no page to be decoded.

On the other hand, in the judgment at step S24, if the result is YES, the printer transfer word number counter 932 is read at regular intervals (step S25).

Then it is judged whether or not the number of words transferred to the printer counted at the printer transfer word number counter 932 has exceeded Np (step S26).

In the judgment at step S26, if the result is YES, control will return to step S21, where the decoding process of the next page stored in the code area of the page memory 28 will be started. After the decoding process of the next page has finished, the next page is printed out on the printer. This is because the time required to decode each page is unknown and varies from page to page.

Figure 29:
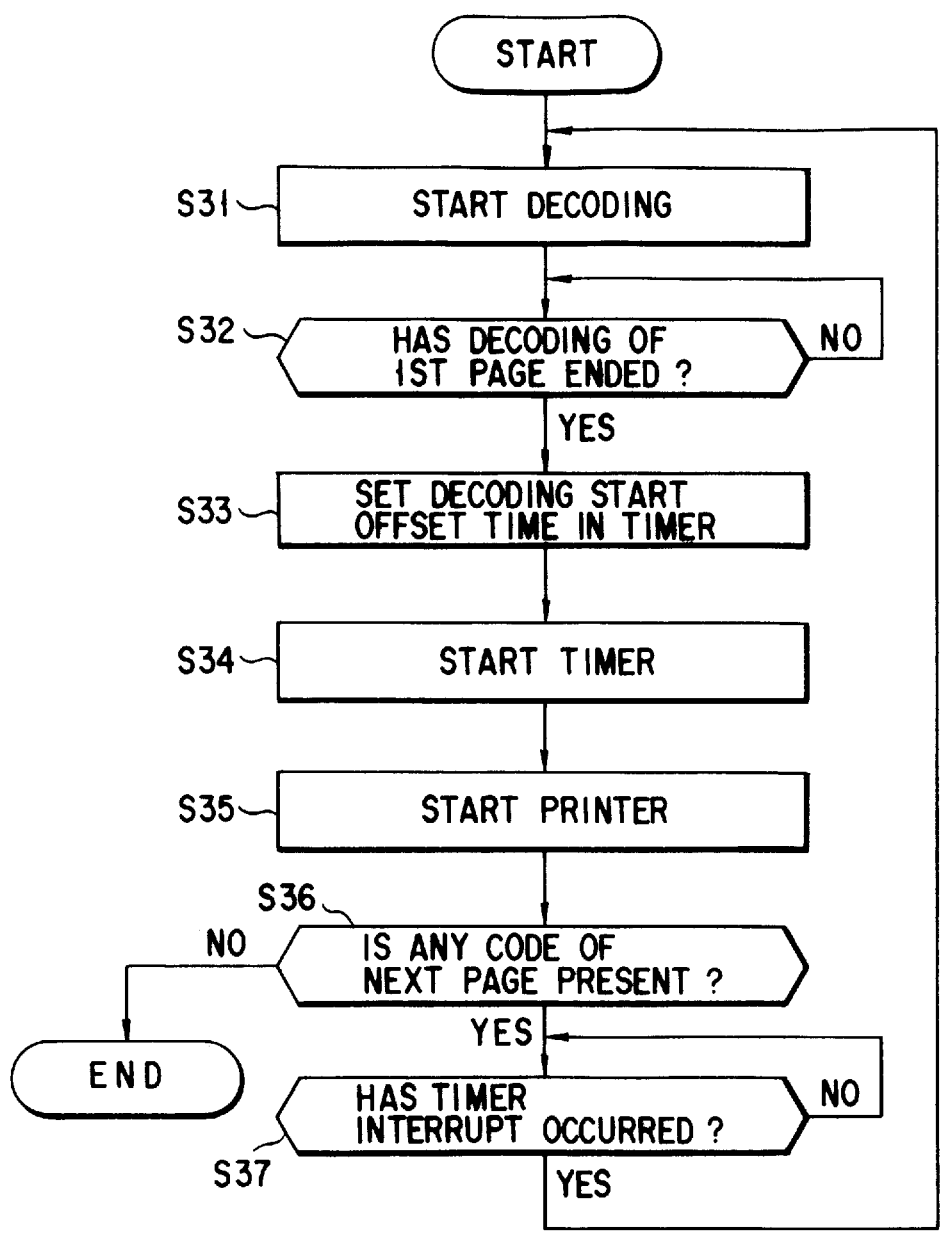
FIG. 29 is a flowchart for decoding control.

A second method of preventing the decoding process from passing the printer output using software will be explained by reference to FIG. 25B and the flowchart of FIG. 29. In the flowchart of FIG. 29, the start timing of the decoding process at the compression/expansion circuit 211 is determined from the time at which the printer 15 started printing. First, as shown in FIG. 25B, the minimum decoding time Pmin for each image size and orientation (lengthways or widthways) of the manuscript, and the time Toffset (decoding start offset time) from the printer output start time To to the printer output end time minus the minimum decoding time Pmin are calculated in advance.

First, the decoding of the first page of codes stored by the compression/expansion circuit 211 in the code area of the page memory 28 is started (step S31). Then, it is judged whether or not the decoding of a page has been completed (step S32). In the judgment at step S32, if the result is YES, the decoding start offset time Toffset will be set in the down counter 904 of the timer 10 (step S33). Then, the timer 10 and printer 15 are caused to start operation (step S34, S35).

Then, it is judge whether or not the code area of the page memory 28 has another page to be decoded (step S36). If it is judged that there is no page to be decoded, the process will be terminated. The coding start offset time Toffset set in the down counter 904 is counted down in response to the frequency-divided clock. After the decoding start offset time Toffset has elapsed since the start of the printer output, the timer 10 outputs an interrupt signal to the system CPU 11. The system CPU 11 judges whether or not any interrupt signal has occurred (step S37).

In the judgment at step S37, if the result is YES, the decoding process of the next page will be started under the control of the system CPU 11 (step S31).

The above explanation is about the advance start of the coding and decoding processes by software control. Hereinafter, the passing prevention of the coding and decoding processes by hardware control will be explained.

Figure 30A:
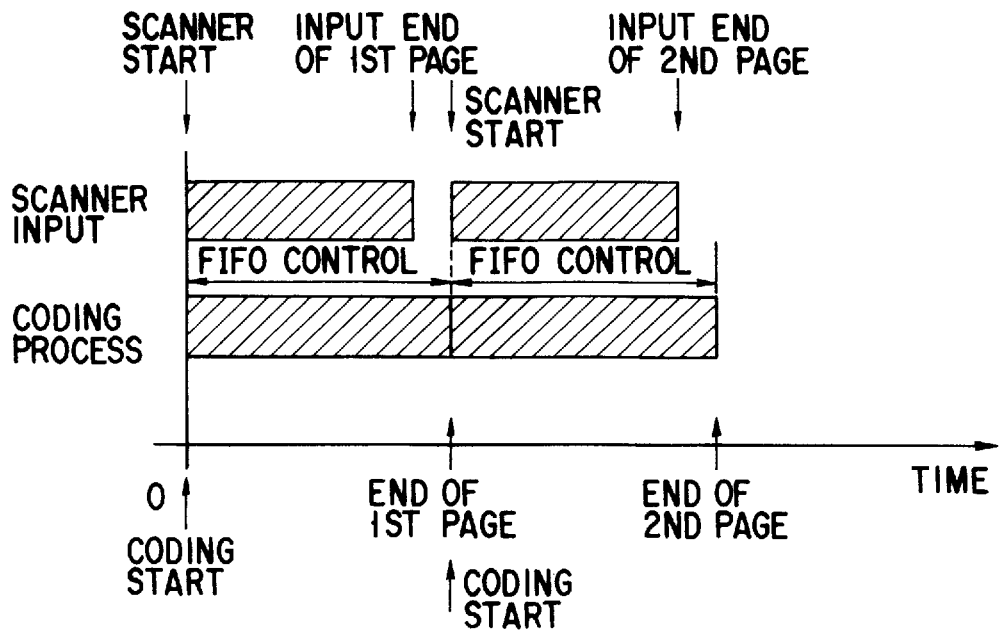
FIGS. 30A and 30B show a scanner input, coding process, printer output, and decoding process by hardware.

First, the scanner input and coding process according to the present invention will be explained by reference to FIG. 30A. The scanner and the coding process are started at the same time and the coding process is controlled by hardware control so that the reading of the coded image data may not pass the writing of the image data from the scanner 13 into the image memory.

If the coding process is faster than the scanner input speed, the coding process will always keep up with the scanner input, enabling the coding process to end at the same time that the scanner input has finished.

Figure 31:
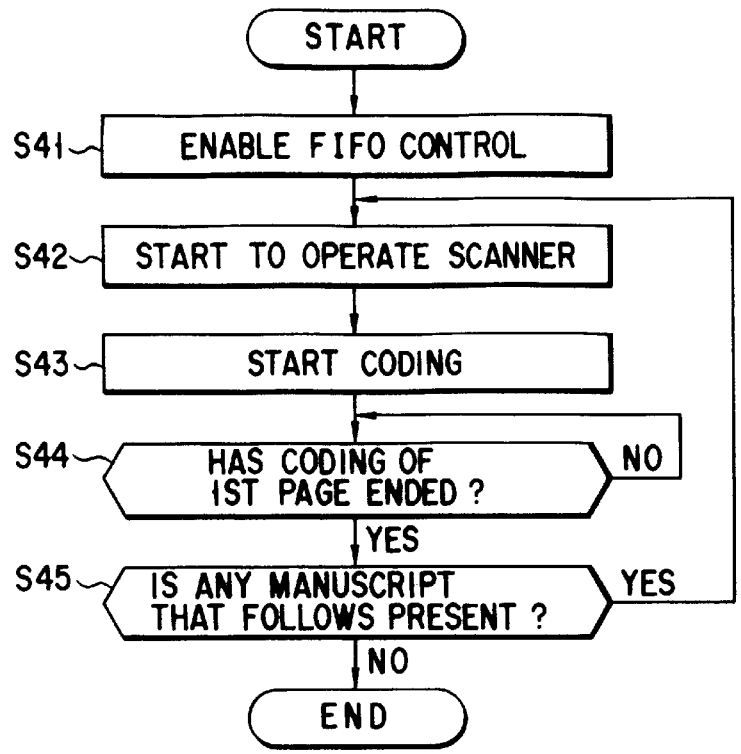
FIG. 31 is a flowchart for coding control.

First, the coding process will be described by reference to the flowchart of FIG. 31. FIFO control is enabled (step S41). Then, the input of the manuscript from the scanner 13 to the page memory 28 is started (step S42) and the coding into the code area of the page memory 28 is started (step S43).

Then, it is judged whether or not the coding of a page of data stored in the page memory 28 has been completed (step S44). In the judgment at step S44, if the result is YES, it will be judged whether or not any manuscript that follows is present (step S53). In the judgment at step S45, if the result is YES, the processes at steps S42 and S43 will be repeated. The series of processes is repeated as many times as the number of manuscripts to be stacked.

Next, a first method of preventing the coding process from passing the scanner input using hardware will be explained. The address in the page memory 28 in which the image data is written from the scanner 13 is compared with the address in the image memory from which the image data is read out for coding and the coding process is controlled.

The writing and reading of the data into and from the image memory are performed on one-dimensionally consecutive physical addresses in the image memory. The address in which the scanner input is written is compared with the address from which the image is read out for coding. If they are equal, the image reading for coding will be inhibited, thereby preventing the coding from passing.

The fact that those two addresses are equal can be known from the empty signals (see FIG. 12) at the FIFO address generators 635, 636. By inputting the empty signal to the FIFO mask in the coding process channel of image bus mediation control 741, the coding process can be prevented by the empty signals from the FIFO address generators.

Hereinafter, a detailed explanation of FIFO control in coding will be given with reference to FIGS. 33A to 33D. FIGS. 33A to 33D show the state of the FIFO area. Because in the initial state shown in FIG. 33A, the scanner 13 has inputted nothing, there is no image data that can be read in the FIFO area and the FIFO status is empty, preventing the coded image data from being read.

Figure 33A:
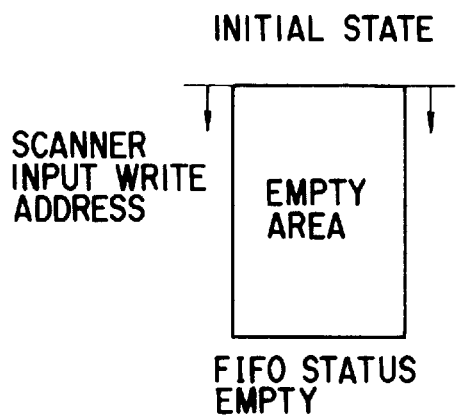
FIGS. 33A to 33D show FIFO control in coding.
Figure 33B:
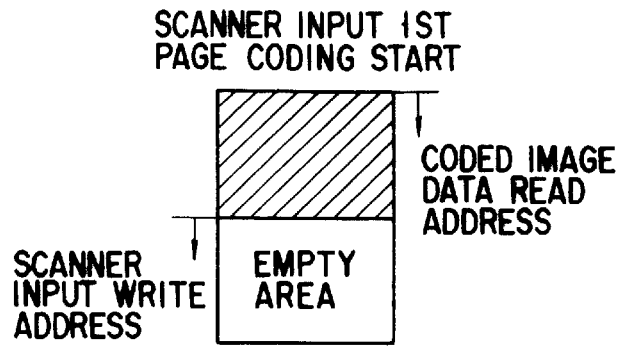

Then, as shown in FIG. 33B, once the scanner input of the first page and the coding of the first page have been started, the image data is written from the scanner 13 into the FIFO area, which cancels the empty state of the FIFO status, allowing the image data to be read out for coding. The read-out image data is coded and written into the code area of the page memory 28.

Figure 33C:
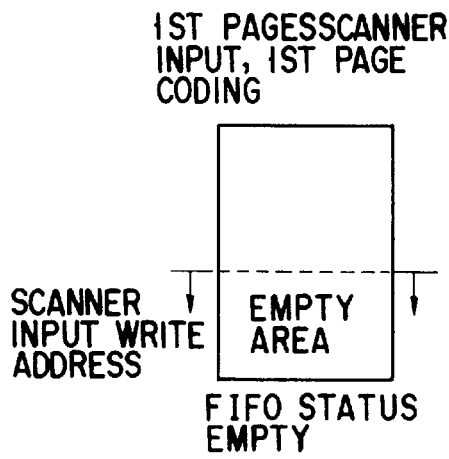

Then, as shown in FIG. 33C, during the scanner input of the first page and the coding of the first page, if the reading of the image data for coding is faster than the speed of the scanner input, the unread image data will run out, making the FIFO status empty and preventing the reading of the image data for coding. Then, if new image data is inputted from the scanner, the empty state will be canceled and the image data for coding will be read out. This will be repeated.

Figure 33D:
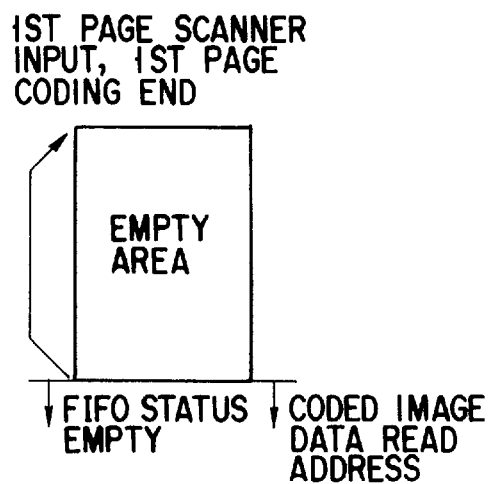

As shown in FIG. 33D, once the input of a page of images has been completed, the coding of a page of images is terminated at the time when all the image data for coding has disappeared from the FIFO area.

Now, a second method of preventing the coding process from passing the scanner input using hardware will be explained. With the second method, the number of words of image data transferred from the scanner 13 and written into the page memory 28 is compared with the number of words of coded image data read and transferred from the image memory. If they are equal, the reading of the coded image will be inhibited, thereby preventing the coding process from passing.

The fact that the former number of words transferred has become equal to the latter can be known from the fact that the output signal of the number-of-transfers comparator 933 (see FIG. 20) in the terminal counter 745 has become active. By inputting the output signal of the number-of-transfers comparator 933 to the FIFO mask in the coding process channel in image bus mediation control 741, the reading operation for coding can be inhibited.

Figure 30B:
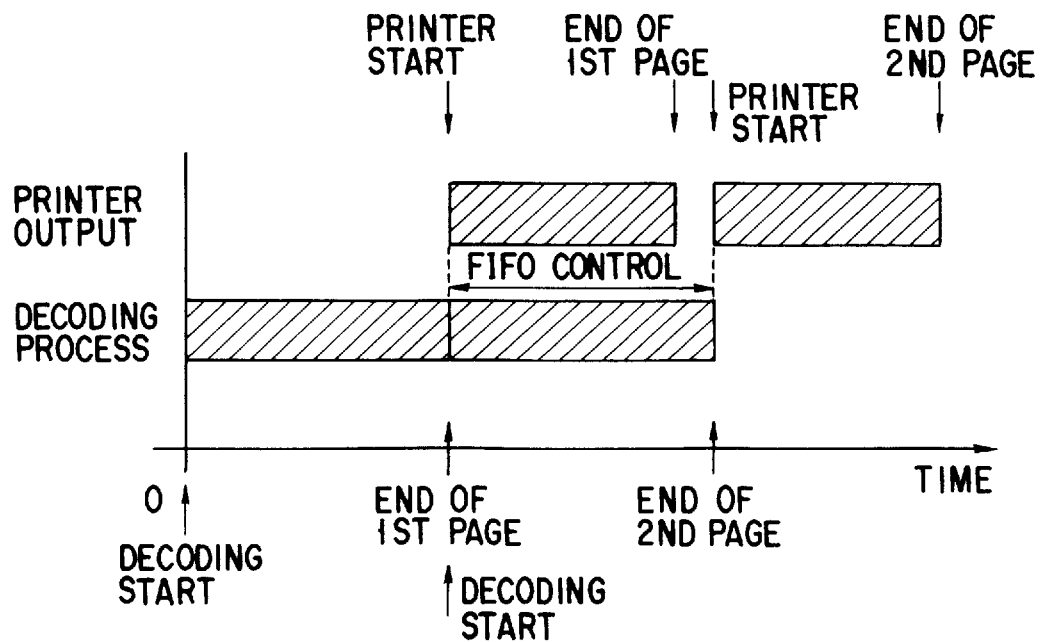

Now, the printer output and decoding process according to the present invention will be explained by reference to FIG. 30B. The printer output and the decoding process are started at the same time and the decoding process is controlled by hardware control so that the reading of the image data from the image memory onto the printer may not pass the writing of the decoded image data.

If the decoding process is faster than the printer output speed, the decoding process will always keep up with the printer output, enabling the decoding process to end at the same time that the printer output has finished.

Figure 32:
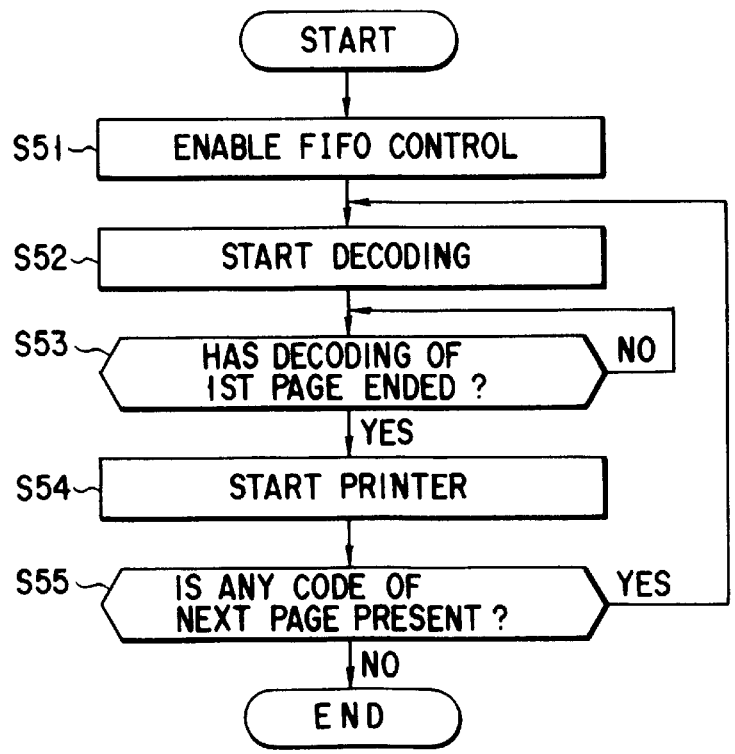
FIG. 32 is a flowchart for decoding control.

The decoding process will be described by reference to the flowchart of FIG. 32. First, FIFO control is enabled (step S51). Then, the decoding process of the first page is started (step S52). Then, it is judged whether or not the decoding of a page of data has been completed (step S53).

In the judgment at step S53, if the result is YES, the output to the printer 15 will be started (step S54).

Then, it is judged whether or not any page of codes that follows is present (step S55). In the judgment at step S55, if the result is YES, the decoding process of the page following that decoded at step S52 will be started.

Next, a first method of preventing the decoding process from passing the printer output using hardware will be explained. Basically, the address in the page memory 28 from which the image data is read onto the printer 15 is compared with the address in the image memory into which the decoded image data is written and the decoding process is controlled.

The writing and reading of the data into and from the image memory 28 are performed on one-dimensionally consecutive physical addresses in the image memory 28.

The address from which the output is read onto the printer 15 is compared with the address in which the decoded image is written. If they are equal, the reading of the decoded image will be inhibited, thereby preventing the decoding from passing. The fact that those addresses have become equal can be known from the full signals from the FIFO address generators 635, 636.

By inputting the full signal to the FIFO mask in the decoding process channel in image bus mediation control 741, the decoding process can be prevented by the full signal (see FIG. 12) from the FIFO address generator.

A detailed explanation of FIFO control during such decoding will be given by reference to FIGS. 34A to 34F. Because decoding has not been effected in the initial state of FIG. 34A, there is no image data to be read and the FIFO status is empty and the printer 15 is out of operation.

Once the decoding of the first page has been started as shown in FIG. 34B, the decoded image data starts to be written into the FIFO area of the page memory 28.

Then, after the decoding of the first page has been completed as shown in FIG. 34C, the FIFO area has no empty area and the FIFO status becomes full, which prevents the coded image data from being written, stopping the decoding.

Next, as shown in FIG. 34D, the first page of decoded image data is outputted onto the printer 15 and at the same time, the decoding of the second page is started. When the output to the printer 15 is started, an empty area appears in the FIFO area, canceling the full status of FIFO. The writing of the second page of decoded image data is continued until the empty area has run out. Then, as shown in FIG. 34E, after the output of the first page onto the printer 15 has finished, the printer is stopped, and the FIFO area is filled with the second page of decoded image data, which makes the FIFO status full, terminating the decoding of the second page.

Then, as shown in FIG. 34F, the output of the second page onto the printer 15 and the decoding of the third page are started.

From this time on, the operation of performing the printer output and the decoding of the following page is repeated.

Now, a second method of preventing the decoding process from passing the printer output using hardware will be explained. With the second method, the number of words of image data read and transferred from the page memory 28 onto the printer 15 is compared with the number of words of decoded image data written into the page memory 28. If they are equal, the decoding process will be inhibited, thereby preventing the decoding process from passing. The fact that the former number of words transferred has become equal to the latter can be known from the fact that the output signal of the number-of-transfers comparator 933 (see FIG. 20) in the terminal counter 745 has become active. By inputting the output signal of the number-of-transfers comparator 933 to the FIFO mask in the decoding process channel in image bus mediation control 741, the decoding operation can be inhibited.

In the embodiment, the writing of the image data read by the scanner 13 into the page memory 28 and the coding of the image data and the decoding and printing of the coded data in the page memory 28 have been explained separately. If two pages of the page memory 28 are provided, the total processing time can be made shorter as much as the sum of the minimum coding time Dmin and the minimum decoding time Pmin by performing the writing of the image data read by the scanner 13 into the page memory 28 and the coding of the image data and the decoding and printing of the coded data in the page memory 28 at the same time (that is, performing the operation of FIG. 24A and that of FIG. 24B at the same time).

As explained in detail, with the present invention, the writing of image data from the scanner into the image memory, the coding of the image data read from the image memory, the decoding from the code memory to the image memory, and the image formation from the decoded image data read from the image memory are caused to be in progress simultaneously. This makes it possible to provide an image forming apparatus capable of shortening the time required for a series of image forming processes without increasing the capacity of the image memory, the series of image forming processes including the reading of image data into the image memory, the coding of the image data, the decoding of the coded data, and the image formation from the decoded image data read from the image memory.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus comprising:

means for reading image data from a manuscript;

an image memory for storing the image data read by the reading means;

means for writing the image data read by the reading means into the image memory;

code memory for storing coded image data;

means for coding the image data stored in the image memory and storing the coded data in the code memory;

means for decoding the coded data stored in the code memory and storing the decoded data into the image memory;

means for forming an image corresponding to the decoded image data stored by the decoding means in the image memory; and control means for enabling a writing operation of the writing means and a coding operation of the coding means to progress simultaneously during controlling so that the coding operation may not pass the writing operation.

2. An image forming apparatus according to claim 1, wherein said control means includes:

means for computing the minimum coding time required to coding the image data of said manuscript;

means for previously computing the number of words of the image data transferred from said reading means between the reading operation start time of said reading means and the writing operation end time of said writing means minus said minimum coding time;

means for counting the number of words of the image data transferred from said reading means between the reading start time and the present time;

means for checking the number of words counted by said counting means at regular intervals; and means for causing said coding means to start coding when the number of words checked by said checking means has exceeded the number of words previously computed by said computing means.

3. An image forming apparatus according to claim 1, wherein said control means includes:

means for computing the minimum coding time required to coding the image data of said manuscript;

means for previously computing the length of time between the reading operation start time of said reading means and the writing operation end time of said writing means minus said minimum coding time;

means for causing said reading means to start reading; and means for causing said coding means to start coding when the length of time computed at said computing means has elapsed since the time that said reading means started to operate.

4. An image forming apparatus according to claim 1, wherein said control means includes:

means for comparing a write address for said writing means to write the image data into said image memory with a read address for the coding means to read the image data from said image memory and controlling said coding means so that said read address may not surpass said write address.

5. An image forming apparatus according to claim 1, wherein said control means includes:

means for comparing the number of transfers of image data from said reading means to said image memory with the number of transfers of image data from said image memory to said coding means and controlling said coding means so that the number of transfers of image data to said coding means may not surpass the number of transfers of image data from said reading means to said image memory.

6. An image forming apparatus according to claim 1, wherein said control means includes:

second control means for enabling a decoding operation of said decoding means and an image forming operation of said image forming means to progress simultaneously during controlling said decoding means so that said decoding operation of the following image data may not pass said image forming operation of the present image data, with the writing operation of said writing means, the coding operation of said coding means, the decoding operation of said decoding means, and the image forming operation of said image forming means being substantially advanced simultaneously.

7. An image forming apparatus comprising:

means for reading image data from a manuscript;

an image memory for storing the image data read by the reading means;

means for writing the image data read by the reading means into the image memory;

code memory for storing coded image data;

means for coding the image data stored in the image memory and storing the coded data in the code memory;

means for decoding the coded data stored in the code memory and storing the decoded data into the image memory;

means for forming an image corresponding to the decoded image data stored by the decoding means in the image memory; and control means for enabling a decoding operation of said decoding means and an image forming operation of said image forming means to progress simultaneously during performing said decoding means so that the decoding operation of the following image data may not pass the image forming operation of the present image data.

8. An image forming apparatus according to claim 7, wherein said control means includes:

means for comparing a write address for said decoding means to write the image data into said image memory with a read address for the image forming means to read the image data from said image memory and controlling said decoding means so that said write address may not surpass said read address.

9. An image forming apparatus according to claim 7, wherein said control means includes:

means for comparing the number of transfers of image data from said decoding means to said image memory with the number of transfers of image data from said image memory to said image forming means and controlling said decoding means so that the number of transfers of image data from said decoding means to said image memory may not surpass the number of transfers of image data to said image forming means.

10. An image forming apparatus comprising:

an image memory for storing image data;

means for writing the image data into the image memory;

means for coding the image data stored in the image memory and storing the decoded data in a code memory;

means for decoding the coded data stored in the code memory and writing the decoded data into the image memory; and control means for enabling a writing operation of said writing means and a coding operation of said coding means to progress simultaneously during controlling so that the coding operation may not pass the writing operation.

11. An image forming apparatus according to claim 10, wherein said control means includes:

means for comparing a write address for said writing means to write the image data into said image memory with a read address for the coding means to read the image data from said image memory and controlling said coding means so that said read address may not surpass said write address.

12. An image forming apparatus according to claim 10, wherein said control means includes:

means for comparing the number of transfers of image data from said reading means to said image memory with the number of transfers of image data from said image memory to said coding means and controlling said coding means so that the number of transfers of image data to said coding means may not surpass the number of transfers of image data from said reading means to said image memory.

13. An image forming apparatus comprising:

an image memory for storing image data;

means for writing the image data into the image memory;

code memory for storing coded image data;

means for coding the image data stored in the image memory and storing the coded data in the code memory;

means for decoding the coded data stored in the code memory and storing the decoded data into the image memory;

means for forming an image corresponding to the decoded image data stored by the decoding means in the image memory; and control means for enabling a writing operation of the writing means and a coding operation of the coding means to progress simultaneously during controlling so that the coding operation may not pass the writing operation.

14. An image forming apparatus according to claim 13, wherein said control means includes:

means for computing the minimum coding time required to coding the image data of said manuscript;

means for previously computing the number of words of the image data transferred from said writing means between the writing operation start time and the writing operation end time of said writing means minus said minimum coding time;

means for counting the number of words of the image data transferred from said writing means between the writing operation start time and the present time;

means for checking the number of words counted by said counting means at regular intervals; and means for causing said coding means to start coding when the number of words checked by said checking means has exceeded the number of words previously computed by said computing means.

15. An image forming apparatus according to claim 13, wherein said control means includes:

means for computing the minimum coding time required to coding the image data of said manuscript;

means for previously computing the length of time between the writing operation start time and the writing operation end time of said writing means minus said minimum coding time;

means for causing said writing means to start writing; and means for causing said coding means to start coding when the length of time computed at said computing means has elapsed since the time that said writing means started to operate.

16. An image forming apparatus according to claim 13, wherein said control means includes:

means for comparing a write address for said writing means to write the image data into said image memory with the read address for the coding means to read the image data from said image memory and controlling said coding means so that said read address may not surpass said write address.

17. An image forming apparatus according to claim 13, wherein said control means includes:

means for comparing the number of transfers of image data from said writing means to said image memory with the number of transfers of image data from said image memory to said coding means and controlling said coding means so that the number of transfers of image data to said coding means may not surpass the number of transfers of image data from said writing means to said image memory.

18. An image forming apparatus according to claim 13, wherein said control means includes:

second control means for enabling a decoding operation of said decoding means and a image forming operation of said image forming means to progress simultaneously during controlling said decoding means so that said decoding operation of the following image data may not pass said image forming operation of the present image data, with the writing operation of said writing means, the coding operation of said coding means, the decoding operation of said decoding means, and the image forming operation of said image forming means being substantially advanced simultaneously.

19. An image forming apparatus comprising:

an image memory for storing image data read;

means for writing the image data into the image memory;

code memory for storing coded image data means for coding the image data stored in the image memory and storing the coded data in the code memory;

means for decoding the coded data stored in the code memory and writing the decoded data into the image memory;

means for forming an image corresponding to the decoded image data stored by the decoding means in the image memory; and control means for enabling a decoding operation of said decoding means and an image forming operation of said image forming means to progress simultaneously during controlling said decoding means so that the decoding operation of the following image data may not pass the image forming operation of the present image data.

20. An image forming apparatus according to claim 19, wherein said control means includes:

means for comparing a write address for said decoding means to write the image data into said image memory with a read address for the image forming means to read the image data from said image memory and controlling said decoding means so that said write address may not surpass said read address.

21. An image forming apparatus according to claim 19, wherein said control means includes:

means for comparing the number of transfers of image data from said decoding means to said image memory with the number of transfers of image data from said image memory to said image forming means and controlling said decoding means so that the number of transfers of image data from said decoding mean to said image memory may not surpass the number of transfers of image data to said image forming means.

* * * * *